US012287466B2

(12) United States Patent
Yonezawa

(10) Patent No.: US 12,287,466 B2
(45) Date of Patent: Apr. 29, 2025

(54) ZOOM LENS AND IMAGING APPARATUS

(71) Applicant: FUJIFILM Corporation, Tokyo (JP)

(72) Inventor: Masaru Yonezawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 320 days.

(21) Appl. No.: 17/648,259

(22) Filed: Jan. 18, 2022

(65) Prior Publication Data
US 2022/0252851 A1    Aug. 11, 2022

(30) Foreign Application Priority Data

Jan. 29, 2021    (JP) ................. 2021-013195

(51) Int. Cl.
G02B 15/14        (2006.01)
G02B 15/16        (2006.01)

(52) U.S. Cl.
CPC ......... *G02B 15/1431* (2019.08); *G02B 15/16* (2013.01)

(58) Field of Classification Search
CPC .............. G02B 15/1431; G02B 15/144; G02B 15/144109; G02B 15/1451; G02B 15/145119
See application file for complete search history.

(56) References Cited

U.S. PATENT DOCUMENTS

| | | |
|---|---|---|
| 4,394,072 A | 7/1983 | Betensky |
| 2015/0160444 A1 | 6/2015 | Koizumi et al. |
| 2015/0241673 A1 | 8/2015 | Nagatoshi |
| 2018/0188510 A1 | 7/2018 | Yonezawa et al. |
| 2018/0217360 A1 | 8/2018 | Ikeda et al. |
| 2019/0377166 A1 | 12/2019 | Komatsu et al. |

FOREIGN PATENT DOCUMENTS

| | | |
|---|---|---|
| JP | S57-122414 A | 7/1982 |
| JP | S62-27712 A | 2/1987 |
| JP | 2013-003255 A | 1/2013 |
| JP | 2015-161695 A | 9/2015 |
| JP | 2018-109709 A | 7/2018 |
| JP | 2018-120152 A | 8/2018 |
| WO | 2014/030304 A1 | 2/2014 |
| WO | 2018/168214 A1 | 9/2018 |

OTHER PUBLICATIONS

An Office Action mailed by the Japanese Patent Office on May 7, 2024, which corresponds to Japanese Patent Application No. 2021-013195 and is related to U.S. Appl. No. 17/648,259; with English language translation.

*Primary Examiner* — Jack Dinh
(74) *Attorney, Agent, or Firm* — Studebaker Brackett PLLC

(57) ABSTRACT

The zoom lens consists of, in order from an object side: a first lens group that has a positive refractive power; a middle group that includes a plurality of lens groups each moving by changing a spacing with an adjacent lens group during zooming; and a final lens group that remains stationary during zooming and has a positive refractive power. Among the plurality of lens groups that move during zooming in the middle group, an image side movable lens group, which is a lens group disposed closest to the image side, has a negative refractive power.

15 Claims, 14 Drawing Sheets

EXAMPLE 1

EXAMPLE 1

EXAMPLE 2

EXAMPLE 3

EXAMPLE 4

EXAMPLE 5

EXAMPLE 5

ZOOM LENS AND IMAGING APPARATUS

CROSS-REFERENCE TO RELATED APPLICATIONS

The present application claims priority under 35 U.S.C. § 119 to Japanese Patent Application No. 2021-013195, filed on Jan. 29, 2021. The above application is hereby expressly incorporated by reference, in its entirety, into the present application.

BACKGROUND

Technical Field

The technology of the present disclosure relates to a zoom lens and an imaging apparatus.

Related Art

In the related art, as a zoom lens applicable to an imaging apparatus such as a broadcast camera, a movie camera, and a digital camera, for example, the lens systems described in JP2018-109709A and JP2015-161695A are known.

SUMMARY

In recent years, there has been a demand for a zoom lens which is reduced in size and has a high magnification so as to have favorable optical performance.

The present disclosure has been made in view of the above circumstances, and an object of the present disclosure is to provide a zoom lens which is reduced in size and has a high magnification so as to have favorable optical performance, and an imaging apparatus comprising the zoom lens.

According to a first aspect of the present disclosure, there is provided a zoom lens consisting of, in order from an object side to an image side: a first lens group that has a positive refractive power; a middle group that includes a plurality of lens groups each moving by changing a spacing with an adjacent lens group during zooming; and a final lens group that remains stationary with respect to an image plane during zooming and has a positive refractive power. Among the plurality of lens groups, an image side movable lens group, which is a lens group disposed closest to the image side, has a negative refractive power, and assuming that a lateral magnification of the image side movable lens group at a wide angle end in a state in which an infinite distance object is in focus is $\beta nW$, and a lateral magnification of the image side movable lens group at a telephoto end in a state in which the infinite distance object is in focus is $\beta nT$, Conditional Expression (1) is satisfied, which is represented by $$1.1 < \beta nT/\beta nW \quad (1).$$

It is preferable that the zoom lens according to the first aspect of the present disclosure satisfies Conditional Expression (1-1) is satisfied, which is represented by $$3 < \beta nT/\beta nW < 40 \quad (1\text{-}1).$$

According to a second aspect of the present disclosure, there is provided a zoom lens consisting of, in order from an object side to an image side: a first lens group that has a positive refractive power; a middle group that includes a plurality of lens groups each moving by changing a spacing with an adjacent lens group during zooming; and a final lens group that remains stationary with respect to an image plane during zooming and has a positive refractive power. Among the plurality of lens groups, an image side movable lens group, which is a lens group disposed closest to the image side, has a negative refractive power, and assuming that a lateral magnification of each lens group in the middle group at a wide angle end in a state in which an infinite distance object is in focus is OW, and a lateral magnification of each lens group in the middle group at a telephoto end in a state in which the infinite distance object is in focus is PT, among the lens groups in the middle group, a lens group having a maximum $|\beta T/\beta W|$ is the image side movable lens group.

Hereinafter, in this section, the zoom lenses according to the first and second aspects of the present disclosure are collectively referred to as the zoom lenses of the above aspects.

Assuming that a lateral magnification of the image side movable lens group at the wide angle end in a state in which the infinite distance object is in focus is $\beta nW$, a lateral magnification of the image side movable lens group at the telephoto end in a state in which the infinite distance object is in focus is $\beta nT$, a focal length of the zoom lens at the wide angle end in a state in which the infinite distance object is in focus is set to fW, and a focal length of the zoom lens at the telephoto end in a state in which the infinite distance object is in focus is fT, it is preferable that the zoom lens of the above-mentioned aspect satisfies Conditional Expression (2), which is represented by $$0.4 < |(\beta nT/\beta nW)/(fT/fW)| \quad (2).$$

It is more preferable to satisfy Conditional Expression (2-1), which is represented by $$0.5 < |(\beta nT/\beta nW)/(fF/fW)| < 10 \quad (2\text{-}1).$$

Assuming that a lateral magnification of the image side movable lens group at the wide angle end in a state in which the infinite distance object is in focus is $\beta nW$, it is preferable that the zoom lens of the above-mentioned aspect satisfies Conditional Expression (3), which is represented by $$\beta nW < 0 \quad (3).$$

It is more preferable to satisfy Conditional Expression (3-1), which is represented by $$-0.4 < \beta nW < -0.001 \quad (3\text{-}1).$$

Assuming that a lateral magnification of the image side movable lens group at the telephoto end in a state in which the infinite distance object is in focus is $\beta nT$, it is preferable that the zoom lens of the above-mentioned aspect satisfies Conditional Expression (4), which is represented by $$\beta nT < -0.1 \quad (4).$$

It is more preferable to satisfy Conditional Expression (4-1), which is represented by $$-2 < \beta nT < -0.5 \quad (4\text{-}1).$$

It is preferable that the image side movable lens group includes a positive lens and a negative lens.

It is preferable that the final lens group includes a positive lens and a negative lens.

Assuming that a lateral magnification of the final lens group at the wide angle end in a state in which the infinite distance object is in focus is $\beta eW$, it is preferable that the zoom lens of the above-mentioned aspect satisfies Conditional Expression (5), which is represented by $$-0.9 < \beta eW < -0.5 \quad (5).$$

It is more preferable to satisfy Conditional Expression (5-1), which is represented by $$-0.85 < \beta eW < -0.6 \quad (5\text{-}1).$$

Assuming that a focal length of the first lens group in a state in which the infinite distance object is in focus is f1, and a focal length of the image side movable lens group in a state in which the infinite distance object is in focus is fn, it is preferable that the zoom lens of the above-mentioned aspect satisfies Conditional Expression (6), which is represented by $$-0.8 < fn/f1 < -0.35 \quad (6).$$

It is preferable that the zoom lens includes a stop closer to the image side than the first lens group. Assuming that a diameter of an on-axis luminous flux on a lens surface closest to the object side in the first lens group at the telephoto end in a state in which the infinite distance object is in focus is h1, and a diameter of an opening portion of the stop at the telephoto end in a state in which the infinite distance object is in focus is hs, it is preferable that the zoom lens satisfy Conditional Expression (7), which is represented by $$1.7 < h1/hs < 2.2 \quad (7).$$

The middle group may be configured to consist of, in order from the object side to the image side, a lens group that has a positive refractive power and moves by changing a spacing with an adjacent lens group during zooming, a lens group that has a negative refractive power and moves by changing a spacing with an adjacent lens group during zooming, and the image side movable lens group.

The middle group may be configured to consist of, in order from the object side to the image side, a lens group that has a negative refractive power and moves by changing a spacing with an adjacent lens group during zooming, and the image side movable lens group.

It is preferable that the first lens group remains stationary with respect to an image plane during zooming.

It is preferable that the first lens group includes at least one lens that moves along an optical axis during focusing.

The imaging apparatus according to another aspect of the present disclosure includes at least one of the zoom lenses according to the first and second aspects of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the terms "~group that has a positive refractive power" and "~group that has a positive refractive power" mean that the group as a whole has a positive refractive power. Similarly, the terms "~group that has a negative refractive power" and "~group has a negative refractive power" mean that the group as a whole has a negative refractive power. The term "a lens that has a positive refractive power" and the term "a positive lens" are synonymous. The term "a lens that has a negative refractive power" and the term "negative lens" are synonymous. The terms "~lens group" and "focus group" are not limited to a configuration consisting of a plurality of lenses, but may be a configuration consisting of only one lens.

A compound aspherical lens (a lens in which a spherical lens and an aspherical film formed on the spherical lens are integrally formed and function as one aspherical lens as a whole) is not regarded as cemented lenses, but the compound aspherical lens is regarded as one lens. Unless otherwise specified, the sign of the refractive power and the surface shape of a lens including an aspherical surface are considered in terms of the paraxial region.

The "focal length" used in a conditional expression is a paraxial focal length. The values used in conditional expressions are values in a case where the d line is used as a reference in a state where the infinite distance object is in focus.

The partial dispersion ratio $\theta gF$ of a certain lens between the g line and the F line is defined by $\theta gF = (Ng - NF)/(NF - NC)$, where Ng, NF, and NC are the refractive indexes of the lens at the g line, the F line, and the C line. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide a zoom lens which is reduced in size and has a high magnification so as to have favorable optical performance, and an imaging apparatus comprising the zoom lens.

DESCRIPTION OF EMBODIMENTS

Hereinafter, embodiments of the present disclosure will be described with reference to the accompanying drawings.

Figure 1:
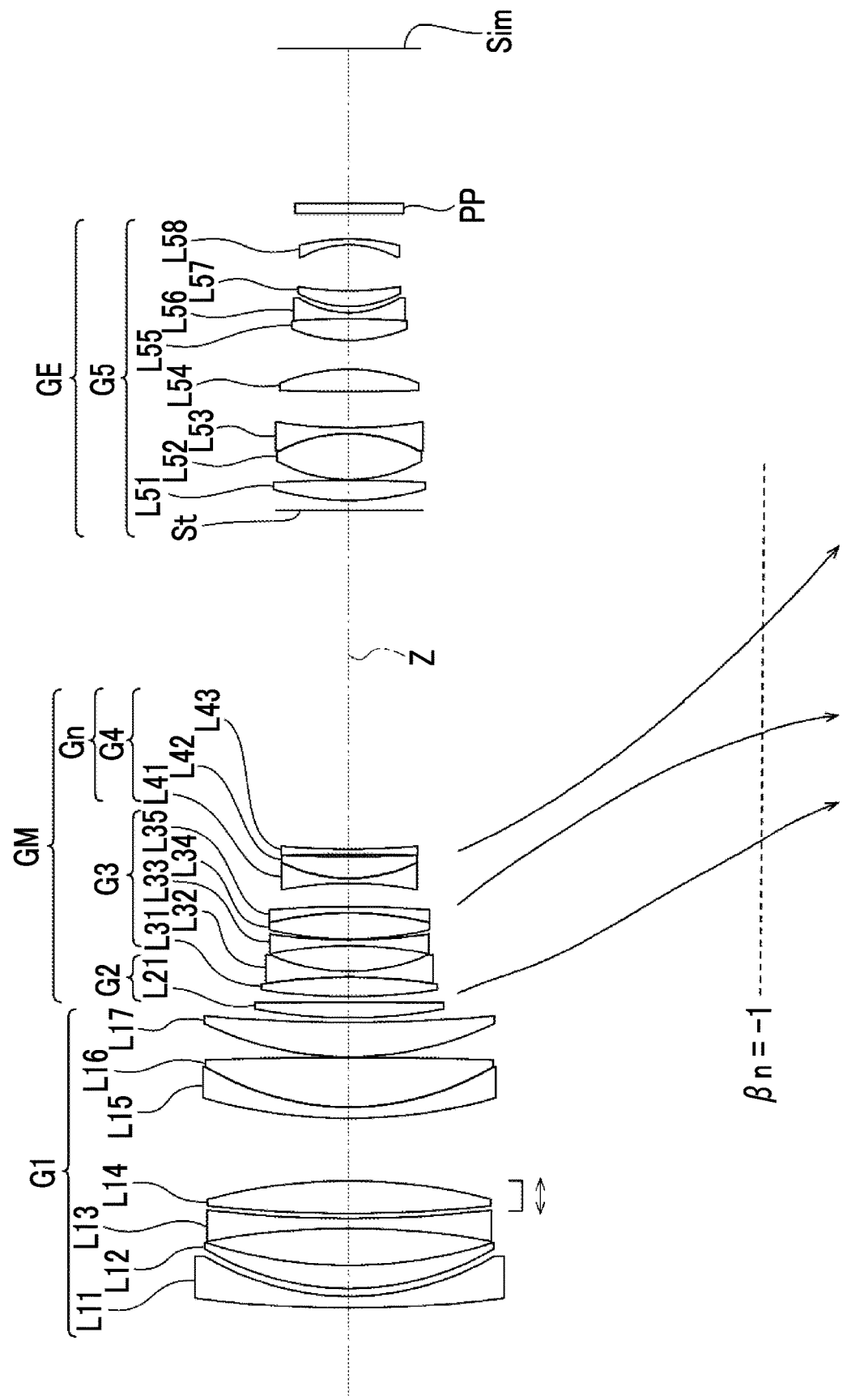
FIG. 1 is a cross-sectional view showing a configuration of a zoom lens according to an embodiment and a diagram showing movement loci thereof, the zoom lens corresponding to a zoom lens of Example 1.
Figure 2:
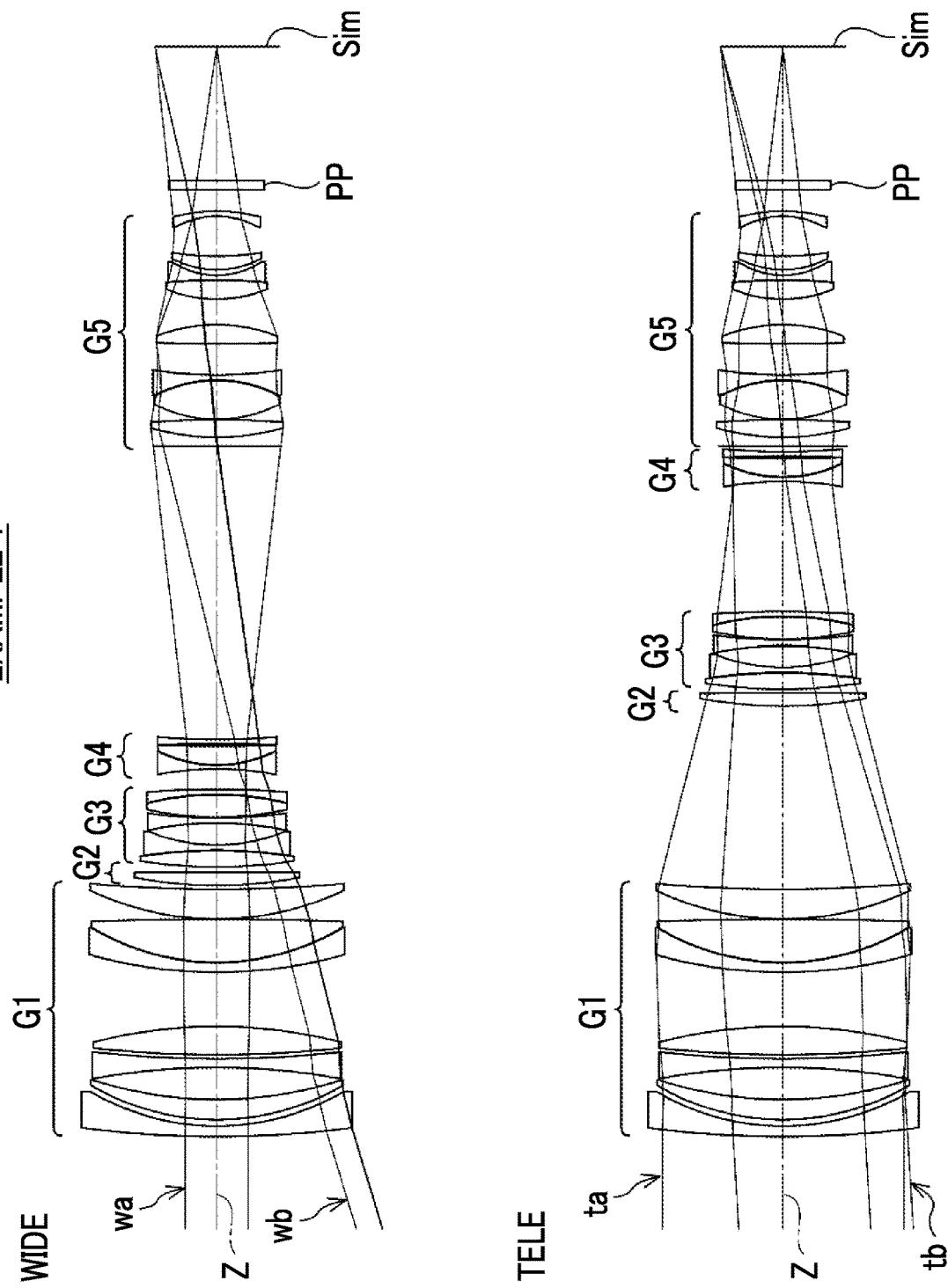
FIG. 2 is a diagram showing a configuration and luminous flux in each zooming state of the zoom lens of FIG. 1.

FIG. 1 shows a cross-sectional view of a configuration and movement loci of a zoom lens according to an embodiment of the present disclosure at a wide angle end. Further, FIG. 2 shows a cross-sectional view and a luminous flux of the configuration of the zoom lens of FIG. 1 in each zooming state. In FIG. 2, the upper part labeled "WIDE" shows the wide angle end state, and the lower part labeled "TELE" shows the telephoto end state. FIG. 2 shows, as the luminous flux, the on-axis luminous flux wa and luminous flux with the maximum angle of view wb in the wide angle end state and the on-axis luminous flux ta and luminous flux with the maximum angle of view tb in the telephoto end state. The examples shown in FIGS. 1 and 2 correspond to a zoom lens of Example 1 described later. FIGS. 1 and 2 show situations where an infinite distance object is in focus, the left side thereof is an object side, and the right side thereof is an image side. Hereinafter, the zoom lens according to the embodiment of the present disclosure will be described mainly with reference to FIG. 1.

FIG. 1 shows an example in which, assuming that a zoom lens is applied to an imaging apparatus, an optical member PP having a parallel plate shape is disposed between the zoom lens and the image plane Sim. The optical member PP is a member assumed to include various filters, a cover glass, and the like. The various filters include, for example, a low pass filter, an infrared cut filter, and a filter that cuts a specific wavelength region. The optical member PP is a member that has no refractive power. It is also possible to configure the imaging apparatus by removing the optical member PP.

The zoom lens according to the present embodiment consists of a first lens group G1, a middle group GM, and a final lens group GE in order from the object side to the image side. The first lens group G1 has a positive refractive power. The middle group GM includes a plurality of lens groups that move by changing the spacing from adjacent lens groups during zooming. Among the plurality of lens groups of the middle group GM, the lens group disposed closest to the image side is referred to as an image side movable lens group Gn. The image side movable lens group Gn has a negative refractive power. The final lens group GE remains stationary with respect to the image plane Sim during zooming and has a positive refractive power. With such a configuration mentioned above, it is easy to achieve both high magnification and reduction in total length. Further, since the height of the ray incident on the lens group closest to the object side in the middle group GM is lowered by the first lens group G1 having a positive refractive power, there is an advantage in suppressing fluctuation in aberration during zooming.

It should be noted that the term "lens group" in the present specification refers to a part including the at least one lens, which is a constituent part of the zoom lens and is divided by an air spacing that changes during zooming. During zooming, the lens groups move or remain stationary, and the mutual spacing between the lenses in one lens group does not change. That is, in the present specification, one lens group is a group in which the spacing between adjacent groups changes during zooming and the total spacing between adjacent lenses does not change within itself.

For example, the zoom lens of FIG. 1 consists of a first lens group G1, a second lens group G2, a third lens group G3, a fourth lens group G4, and a fifth lens group G5, in order from the object side to the image side. In the example of FIG. 1, the middle group GM consists of the second lens group G2, the third lens group G3, and the fourth lens group G4, and the final lens group GE consists of the fifth lens group G5. In the example of FIG. 1, the image side movable lens group Gn consists of the fourth lens group G4.

In the example of FIG. 1, during zooming, the first lens group G1 and the fifth lens group G5 remain stationary with respect to the image plane Sim, and the second lens group G2, the third lens group G3, and the fourth lens group G4 move along the optical axis Z by changing the spacing from the adjacent lens groups. In FIG. 1, arrows below respective lens groups indicate movement loci of the second lens group G2, the third lens group G3, and the fourth lens group G4 during zooming from the wide angle end to the telephoto end.

Each lens group in the example of FIG. 1 is composed of the lenses to be described below. That is, the first lens group G1 consists of seven lenses L11 to L17 in order from the object side to the image side. The second lens group G2 consists of one lens L21. The third lens group G3 consists of five lenses L31 to L35 in order from the object side to the image side. The fourth lens group G4 consists of three lenses L41 to L43 in order from the object side to the image side. The fifth lens group G5 consists of an aperture stop St and eight lenses L51 to L58 in order from the object side to the image side. The aperture stop St shown in FIG. 1 does not indicate a shape thereof, but indicates a position thereof in the optical axis direction.

Hereinafter, preferable and possible configurations of the zoom lens of the present disclosure will be described. In the following description of preferable and possible configurations, the "zoom lens of the present disclosure" is also simply referred to as a "zoom lens" in order to avoid redundancy.

Assuming that a lateral magnification of each lens group of the middle group GM at the wide angle end is βW and a lateral magnification of each lens group of the middle group GM at the telephoto end is βT, among the lens groups of the middle group GM, it is preferable that a lens group having a maximum |βT/βW| is the image side movable lens group Gn. In such a case, it is easy to achieve both high magnification and reduction in total length. It should be noted that OW and OT are values in a state in which the infinite distance object is in focus. Further, the term "among the lens groups of the middle group GM" described herein means "among all the lens groups included in the middle group GM", and includes both the lens groups that move during zooming in the middle group GM and the lens groups that remain stationary during zooming in the middle group GM.

Assuming that a lateral magnification of the image side movable lens group Gn at the wide angle end is βnW and a lateral magnification of the image side movable lens group Gn at the telephoto end is βnT, it is preferable that the zoom lens satisfies Conditional Expression (1). βnW and βnT are values in a state in which the infinite distance object is in focus. By not allowing the corresponding value of Conditional Expression (1) to be equal to or less than the lower limit, the zooming effect of the image side movable lens group Gn is prevented from becoming excessively weak. Therefore, both high magnification and reduction in total length can be easily achieved. Further, it is more preferable that the zoom lens satisfies Conditional Expression (1-1). By not allowing the corresponding value of Conditional Expression (1-1) to be equal to or less than the lower limit, the effect of Conditional Expression (1) can be further enhanced. By not allowing the corresponding value of Conditional Expression (1-1) to be equal to or greater than the upper limit, the zooming effect of the image side movable lens group Gn is prevented from becoming excessively strong. Therefore, it is easy to suppress fluctuation in aberration during zooming while achieving reduction in total length. In order to obtain more favorable characteristics, it is yet more preferable that the zoom lens satisfies Conditional Expression (1-2), and it is most preferable that the zoom lens satisfies Conditional Expression (1-3).

$$1.1 < \beta nT/\beta nW \quad (1)$$

$$3 < \beta nT/\beta nW < 40 \quad (1\text{-}1)$$

$$5 < \beta nT/\beta nW < 30 \quad (1\text{-}2)$$

$$6.5 < \beta nT/\beta nW < 25 \quad (1\text{-}3)$$

Assuming that a focal length of the zoom lens at the wide angle end is fW and a focal length of the zoom lens at the telephoto end is fT, it is preferable that the zoom lens satisfies Conditional Expression (2). fW and fT are values in a state in which the infinite distance object is in focus. The definitions of βnW and βnT in Conditional Expression (2) are the same as those in Conditional Expression (1). By not allowing the corresponding value of Conditional Expression (2) to be equal to or less than the lower limit, the zooming effect of the image side movable lens group Gn is prevented from becoming excessively weak. Therefore, both high magnification and reduction in total length can be easily achieved. Further, it is more preferable that the zoom lens satisfies Conditional Expression (2-1). By not allowing the corresponding value of Conditional Expression (2-1) to be equal to or less than the lower limit, the effect of Conditional Expression (2) can be further enhanced. By not allowing the corresponding value of Conditional Expression (2-1) to be equal to or greater than the upper limit, the zooming effect of the image side movable lens group Gn is prevented from becoming excessively strong. Therefore, it is easy to suppress fluctuation in aberration during zooming while achieving reduction in total length. In order to obtain more favorable characteristics, it is yet more preferable that the zoom lens satisfies Conditional Expression (2-2), and it is most preferable that the zoom lens satisfies Conditional Expression (2-3).

$$0.4 < |(\beta nT/\beta nW)/(fF/fW)| \quad (2)$$

$$0.5 < -|(\beta nT/\beta nW)/(fF/fW)| < 10 \quad (2\text{-}1)$$

$$1.01 < |(\beta nT/\beta nW)/(fF/fW)| < 8 \quad (2\text{-}2)$$

$$1.6 < |(\beta nT/\beta nW)/(fF/fW)| < 6 \quad (2\text{-}3)$$

It is preferable that the zoom lens satisfies Conditional Expression (3). The definition of βnW in Conditional Expression (3) is the same as that in Conditional Expression (1). By not allowing the corresponding value of Conditional Expression (3) to be equal to or greater than the upper limit, it is easy to suppress fluctuation in aberration during zooming while achieving high magnification. Further, it is more preferable that the zoom lens satisfies Conditional Expression (3-1). By not allowing the corresponding value of Conditional Expression (3-1) to be equal to or greater than the upper limit, the effect of Conditional Expression (3) can be further enhanced. By not allowing the corresponding value of Conditional Expression (3-1) to be equal to or less than the lower limit, it is easy to achieve both high magnification and reduction in total length. In order to obtain more favorable characteristics, it is yet more preferable that the zoom lens satisfies Conditional Expression (3-2), and it is most preferable that the zoom lens satisfies Conditional Expression (3-3).

$$\beta nW < 0 \quad (3)$$

$$-0.4 < \beta nW < -0.001 \quad (3\text{-}1)$$

$$-0.3 < \beta nW < -0.01 \quad (3\text{-}2)$$

$$-0.2 < \beta nW < -0.01 \quad (3\text{-}3)$$

Further, it is preferable that the zoom lens satisfies Conditional Expression (4). The definition of βnT in Conditional Expression (4) is the same as that in Conditional Expression (1). By not allowing the corresponding value of Conditional Expression (4) to be equal to or greater than the upper limit, it is easy to achieve both high magnification and reduction in total length. Further, it is more preferable that the zoom lens satisfies Conditional Expression (4-1). By not allowing the corresponding value of Conditional Expression (4-1) to be equal to or greater than the upper limit, the effect of Conditional Expression (4) can be further enhanced. By not allowing the corresponding value of Conditional Expression (4-1) to be equal to or less than the lower limit, it is possible to suppress the magnification ratio of the aberration occurring in the lens group closer to the object side than the image side movable lens group Gn. Therefore, there is an advantage in aberration correction. In order to obtain more favorable characteristics, it is yet more preferable that the zoom lens satisfies Conditional Expression (4-2).

$$\beta nT < -0.1 \quad (4)$$

$$-2 < \beta nT < -0.5 \quad (4\text{-}1)$$

$$-1.5 < \beta nT < -1 \quad (4\text{-}2)$$

Assuming that a lateral magnification of the final lens group GE at the wide angle end is βeW, it is preferable that the zoom lens satisfies Conditional Expression (5). βeW is a value in a state in which the infinite distance object is in focus. By not allowing the corresponding value of Conditional Expression (5) to be equal to or less than the lower limit, it is possible to suppress an increase in magnification ratio of the aberration occurring in the lens group closer to the object side than the final lens group GE. Therefore, there is an advantage in aberration correction. By not allowing the corresponding value of Conditional Expression (5) to be equal to or greater than the upper limit, it is possible to suppress an increase in size of the lens group closer to the object side than the final lens group GE. Therefore, the total length can be easily reduced. In order to obtain more favorable characteristics, it is more preferable that the zoom lens satisfies Conditional Expression (5-1), and it is yet more preferable that the zoom lens satisfies Conditional Expression (5-2).

$$-0.9 < \beta eW < -0.5 \quad (5)$$

$$-0.85 < \beta eW < -0.6 \quad (5\text{-}1)$$

$$-0.8 < \beta eW < -0.65 \quad (5\text{-}2)$$

Assuming that a focal length of the first lens group G1 is f1 and a focal length of the image side movable lens group Gn is fn, it is preferable that the zoom lens satisfies Conditional Expression (6). f1 and fn are values in a state in which the infinite distance object is in focus. By not allowing the corresponding value of Conditional Expression (6) to be equal to or less than the lower limit, the negative refractive power of the image side movable lens group Gn is prevented from becoming excessively weak. Therefore, it is possible to suppress the amount of movement of the image side movable lens group Gn during zooming. As a result, the total length can be easily reduced. By not allowing the corresponding value of Conditional Expression (6) to be equal to or greater than the upper limit, the negative refractive power of the image side movable lens group Gn is prevented from becoming excessively strong. Therefore, it is easy to suppress fluctuation in aberration during zooming. In order to obtain more favorable characteristics, it is more preferable that the zoom lens satisfies Conditional Expression (6-1), and it is yet more preferable that the zoom lens satisfies Conditional Expression (6-2).

$$-0.8 < fn/f1 < -0.35 \tag{6}$$

$$-0.7 < fn/f1 < -0.38 \tag{6-1}$$

$$-0.65 < fn/f1 < -0.42 \tag{6-2}$$

It is preferable that the zoom lens includes an aperture stop St closer to the image side than the first lens group G1. In such a case, there is an advantage in reducing the size of the stop unit.

In a configuration in which the zoom lens includes an aperture stop St closer to the image side than the first lens group G1, assuming that a diameter of the on-axis luminous flux on the lens surface closest to the object side in the first lens group G1 at the telephoto end is h1, and a diameter of an opening portion of the aperture stop St at the telephoto end is hs, it is preferable that the zoom lens satisfies Conditional Expression (7). h1 and hs are values in a state in which the infinite distance object is in focus. By not allowing the corresponding value of Conditional Expression (7) to be equal to or less than the lower limit, it is possible to suppress an increase in diameter of the opening portion of the aperture stop St. Therefore, it is possible to suppress an increase in size of the stop unit. As a result, it is easy to achieve reduction in size of the zoom lens device including mechanical parts. By not allowing the corresponding value of Conditional Expression (7) to be equal to or greater than the upper limit, it is possible to suppress an increase in size of the lens group closer to the object side than the aperture stop St. Therefore, the total length can be easily reduced. In order to obtain more favorable characteristics, it is more preferable that the zoom lens satisfies Conditional Expression (7-1), and it is yet more preferable that the zoom lens satisfies Conditional Expression (7-2).

$$1.7 < h1/hs < 2.2 \tag{7}$$

$$1.75 < h1/hs < 2.1 \tag{7-1}$$

$$1.8 < h1/hs < 2 \tag{7-2}$$

Assuming that a refractive index of at least one negative lens of the image side movable lens group Gn at the d line is Ndn, it is preferable that the zoom lens satisfies Conditional Expression (8). By not allowing the corresponding value of Conditional Expression (8) to be equal to or less than the lower limit, it is possible to suppress the absolute value of the curvature radius of the negative lens from becoming small. Therefore, it is easy to correct high-order aberration. The "high-order aberration" means fifth-order or higher aberration. It is more preferable that the zoom lens satisfies Conditional Expression (8-1). By not allowing the corresponding value of Conditional Expression (8-1) to be equal to or less than the lower limit, the effect of Conditional Expression (8) can be further enhanced. Generally, in an optical material, the Abbe number decreases as the refractive index increases. Therefore, by not allowing the corresponding value of Conditional Expression (8-1) to be equal to or greater than the upper limit, it is possible to prevent the Abbe number from becoming excessively small. Thereby, it is easy to suppress fluctuation in chromatic aberration during zooming. In order to obtain more favorable characteristics, it is yet more preferable that the zoom lens satisfies Conditional Expression (8-2).

$$1.75 < Ndn \tag{8}$$

$$1.8 < Ndn < 2.1 \tag{8-1}$$

$$1.85 < Ndn < 2 \tag{8-2}$$

Assuming that a maximum effective diameter on the lens surface of the middle group GM is EDm and a diameter of the on-axis luminous flux on the lens surface closest to the object side in the first lens group G1 at the telephoto end is h1, it is preferable that the zoom lens satisfies Conditional Expression (9). EDm and h1 are values in a state in which the infinite distance object is in focus. By not allowing the corresponding value of Conditional Expression (9) to be equal to or less than the lower limit, convergence of the luminous flux in the first lens group G1 is prevented from becoming excessively strong. Therefore, various aberrations at the telephoto end can be easily corrected. By not allowing the corresponding value of Conditional Expression (9) to be equal to or greater than the upper limit, it is possible to suppress an increase in size of the middle group GM. Therefore, it is possible to suppress an increase in size of the drive mechanism due to zooming. As a result, there is an advantage in reduction in size of the apparatus. In order to obtain more favorable characteristics, it is more preferable that the zoom lens satisfies Conditional Expression (9-1), and it is yet more preferable that the zoom lens satisfies Conditional Expression (9-2).

$$0.2 < EDm/h1 < 1.5 \tag{9}$$

$$0.4 < EDm/h1 < 1.1 \tag{9-1}$$

$$0.6 < EDm/h1 < 0.8 \tag{9-2}$$

In the technique of the present disclosure, twice the distance to the optical axis Z from the intersection between the lens surface and the ray passing through the outermost side among luminous flux incident onto the lens surface from the object side and emitted to the image side is the "effective diameter" of the lens surface. The "outside" here is the radial outside centered on the optical axis Z, that is, the side separated from the optical axis Z. Further, the "ray passing through the outermost side" is determined in consideration of the entire zooming range.

Figure 3:
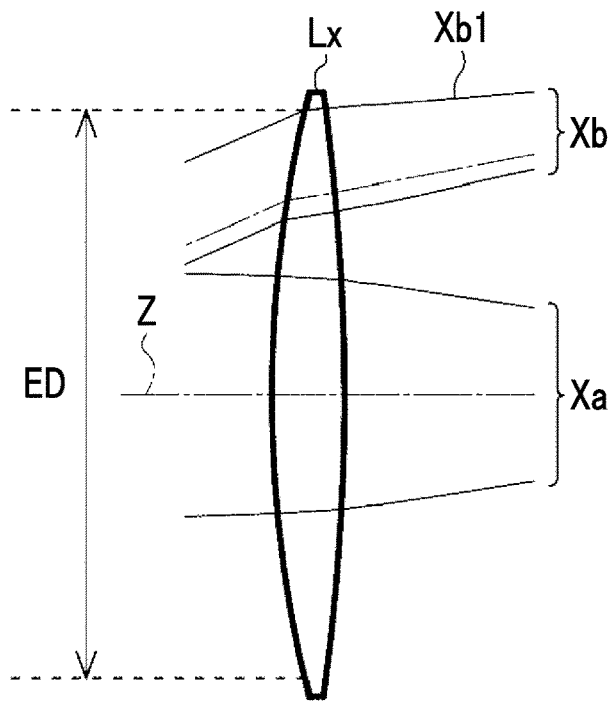
FIG. 3 is a diagram for explaining an effective diameter.

As an explanatory diagram, FIG. 3 shows an example of an effective diameter ED. In FIG. 3, the left side is the object side and the right side is the image side. FIG. 3 shows an on-axis luminous flux Xa and an off-axis luminous flux Xb passing through a lens Lx. In the example of FIG. 3, a ray Xb1, which is the upper ray of the off-axis luminous flux Xb, is the ray passing through the outermost side. Therefore, in the example of FIG. 3, twice the distance to the optical axis Z from the intersection between the ray Xb1 and the object side surface of the lens Lx is the effective diameter ED of the object side surface of the lens Lx. In FIG. 3, the upper ray of the off-axis luminous flux Xb is the ray passing through the outermost side, but which ray is the ray passing through the outermost side depends on the optical system.

Assuming that an angle formed by the normal line of the lens surface and the optical axis Z at the effective diameter end of the lens surface is α, it is preferable that the final lens group GE includes one or more convex lens surfaces satisfying Conditional Expression (10). In Conditional Expression (10), the unit of a is degrees. By not allowing the corresponding value of Conditional Expression (10) to be equal to or less than the lower limit, it is easy to effectively correct spherical aberration occurring on other surfaces. As a result, there is an advantage in suppressing the aberration in the whole system. By not allowing the corresponding value of Conditional Expression (10) to be equal to or greater than the upper limit, it is possible to suppress an increase in processing difficulty of the convex surface. As a result, there is an advantage in ensuring surface accuracy. In order to obtain more favorable characteristics, instead of Conditional Expression (10), it is more preferable to satisfy Conditional Expression (10-1), and it is yet more preferable to satisfy Conditional Expression (10-2).

$$15<|\alpha|<40 \tag{10}$$

$$18<|\alpha|<35 \tag{10-1}$$

$$22<|\alpha|<31 \tag{10-2}$$

Figure 4:
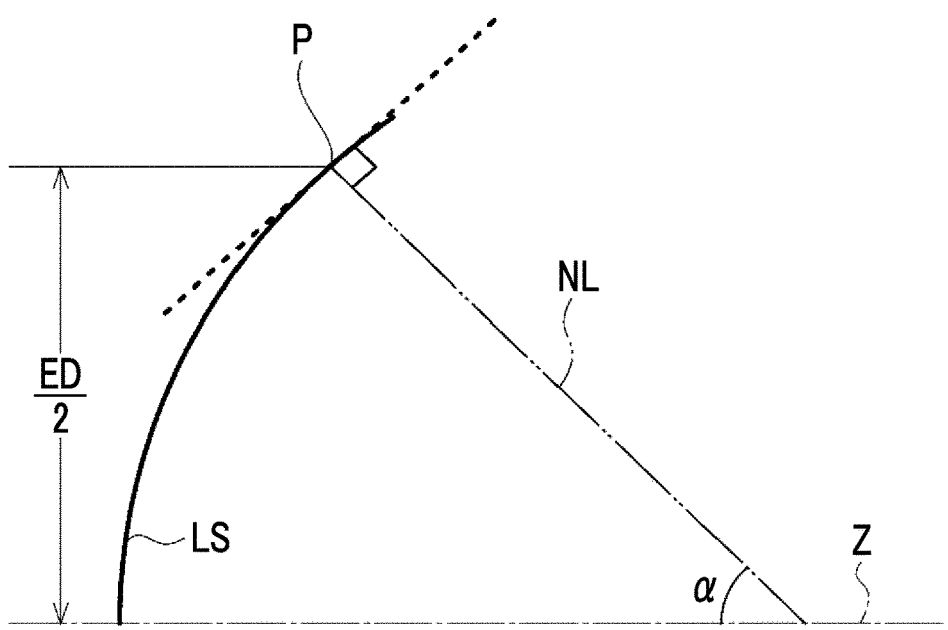
FIG. 4 is a diagram for explaining u.

As an explanatory diagram, FIG. 4 shows an example of the above-mentioned u. In FIG. 4, a tangent line of a lens surface LS at an effective diameter end P of the convex lens surface LS is indicated by a broken line, a normal line NL of the lens surface LS is indicated by a two-dot chain line, and an angle α formed by the normal line NL and the optical axis Z is shown. The effective diameter end P is the intersection between the ray passing through the outermost side (not shown in FIG. 4) and the lens surface LS in the above-mentioned definition of the effective diameter. In the example of FIG. 4, the effective diameter is ED, and the height of the effective diameter end P from the optical axis Z is ED/2.

In the configuration in which the aperture stop St is disposed closer to the image side than the first lens group G1, it is preferable that the final lens group GE includes one or more convex lens surfaces satisfying Conditional Expression (10) and Conditional Expression (11). In Conditional Expression (11), a distance on the optical axis from the aperture stop St to the convex lens surface at the wide angle end is Du. Further, a sum of the distance on the optical axis from the aperture stop St to the lens surface closest to the image side in the final lens group GE at the wide angle end and an air conversion distance on the optical axis from the lens surface closest to the image side in the final lens group GE to the image plane is Dsim. Dα and Dsim are values in a state in which the infinite distance object is in focus. By not allowing the corresponding value of Conditional Expression (11) to be equal to or less than the lower limit, the degree of separation between the on-axis ray and the off-axis ray on the convex lens surface is prevented from becoming excessively small. Therefore, it is easy to correct field curvature. By not allowing the corresponding value of Conditional Expression (11) to be equal to or greater than the upper limit, the degree of separation between the on-axis ray and the off-axis ray on the convex lens surface is prevented from becoming excessively large. Therefore, it is easy to correct spherical aberration. In order to obtain more favorable characteristics, instead of Conditional Expression (11), it is more preferable to satisfy Conditional Expression (11-1), and it is yet more preferable to satisfy Conditional Expression (11-2).

$$0.02<D\alpha/D\text{sim}<0.12 \tag{11}$$

$$0.035<D\alpha/D\text{sim}<0.09 \tag{11-1}$$

$$0.05<D\alpha/D\text{sim}<0.075 \tag{11-2}$$

Assuming that an Abbe number of at least one negative lens of the middle group GM based on the d line is vm and the partial dispersion ratio between the g line and the F line is θgFm, it is preferable that the zoom lens satisfies Conditional Expression (12). By satisfying Conditional Expression (12), there is an advantage in suppressing fluctuation in lateral chromatic aberration during zooming. In order to obtain more favorable characteristics, it is more preferable that the zoom lens satisfies Conditional Expression (12-1), and it is yet more preferable that the zoom lens satisfies Conditional Expression (12-2).

$$0.03<\theta gFm+0.0018\times vm-0.64833<0.1 \tag{12}$$

$$0.035<\theta gFm+0.0018\times vm-0.64833<0.07 \tag{12-1}$$

$$0.041<\theta gFm+0.0018\times vm-0.64833<0.058 \tag{12-2}$$

Assuming that an Abbe number of at least one positive lens of the first lens group G1 based on the d line is v1p, it is preferable that the zoom lens satisfies Conditional Expression (13). By not allowing the corresponding value of Conditional Expression (13) to be equal to or less than the lower limit, there is an advantage in suppressing fluctuation in longitudinal chromatic aberration during zooming. By not allowing the corresponding value of Conditional Expression (13) to be equal to or greater than the upper limit, there is an advantage in suppressing fluctuation in lateral chromatic aberration during zooming. In order to obtain more favorable characteristics, it is more preferable that the zoom lens satisfies Conditional Expression (13-1), and it is yet more preferable that the zoom lens satisfies Conditional Expression (13-2).

$$48<v1p<102 \tag{13}$$

$$56<v1p<94 \tag{13-1}$$

$$65<v1p<87 \tag{13-2}$$

The first lens group G1 may be configured to comprise at least one lens that moves along the optical axis Z during focusing. That is, at least one lens of the first lens group G1 may be configured to perform focusing by moving along the optical axis Z. In the following description, a group that moves during focusing is referred to as a focus group. In a case where the first lens group G1 includes a focus group, an amount of operation of the focus group during focusing at the telephoto end can be suppressed. Therefore, the closest subject distance can be shortened. In particular, in a lens system in which the first lens group G1 remains stationary with respect to the image plane Sim during zooming, in a case where the first lens group G1 is configured to comprise a focus group, an amount of operation of the focus group during focusing can be made constant in the entire zooming range. Therefore, a drive mechanism can be simplified.

The focus group may be configured to consist of only one lens of the first lens group G1. In such a case, there is an advantage in achieving reduction in weight of the focus group. In the example of FIG. 1, the focus group consists only of the lens L14. The parentheses below the lens L14 in FIG. 1 and the double-headed arrow in the horizontal direction indicate that the lens L14 is the focus group.

The first lens group G1 may be configured to remain stationary with respect to the image plane Sim during zooming. In such a case, since the total length does not change during zooming, it is easy to use a mat box or the like. Further, since fluctuation in the center of gravity of the lens system during zooming can be reduced, the convenience during imaging can be enhanced.

It is preferable that the image side movable lens group Gn includes a positive lens and a negative lens. In such a case, it is easy to suppress fluctuation in aberration during zooming. Specifically, for example, the image side movable lens group Gn may be configured to consist of one positive lens and two negative lenses. In such a case, it is easy to suppress fluctuation in aberration during zooming while ensuring the negative refractive power. More specifically, the image side movable lens group Gn may be configured to consist of a cemented lens, which is formed by cementing one positive lens and one negative lens, and one negative lens. In such a case, it is easy to suppress fluctuation in chromatic aberration during zooming, in particular, while ensuring the negative refractive power.

In a state in which the infinite distance object is in focus, during zooming from the wide angle end to the telephoto end, the zoom lens may be configured to have a state in which the lateral magnification of the image side movable lens group Gn is −1 times. In such a case, it is easy to achieve both high magnification and reduction in total length. In the diagram of movement loci of FIG. 1, the zoom position in a state where the lateral magnification of the image side movable lens group Gn is −1 is indicated by a broken line, and "βn=−1" is written on the left side of the broken line.

The zoom lens may be configured to include an aperture stop St closer to the image side than the middle group GM. In such a case, there is an advantage in reducing the size of the stop unit.

The middle group GM may be configured to consist of, in order from the object side to the image side, a lens group that has a positive refractive power and moves by changing a spacing with an adjacent lens group during zooming, a lens group that has a negative refractive power and moves by changing a spacing with an adjacent lens group during zooming, and the image side movable lens group Gn. In such a case, it is easy to satisfactorily correct distortion at the wide angle end. Further, since the amount of movement of each lens group during zooming can be reduced, the total length can be easily shortened.

Alternatively, The middle group GM may be configured to consist of, in order from the object side to the image side, a lens group that has a negative refractive power and moves by changing a spacing with an adjacent lens group during zooming, and the image side movable lens group Gn. In such a case, the drive mechanism of the lens group that moves during zooming can be simplified. As a result, there is an advantage in reducing the manufacturing error and the component cost.

It is preferable that the final lens group GE includes a positive lens and a negative lens. In such a case, it is easy to suppress fluctuation in aberration during zooming.

The example shown in FIG. 1 is an example, and various modifications can be made without departing from the scope of the technology of the present disclosure. For example, the number of lens groups included in the middle group GM and the number of lenses included in each lens group may be different from those in the example of FIG. 1.

The above-mentioned preferred configurations and available configurations may be optional combinations, and it is preferable to selectively adopt the configurations in accordance with required specification. It should be noted that the conditional expressions that the zoom lens of the present disclosure preferably satisfies are not limited to the conditional expressions described in the form of the expression, and the lower limit and the upper limit are selected from the preferable, more preferable, yet more preferable, and most preferable conditional expressions. The conditional expressions may include all conditional expressions obtained through optional combinations.

The following are two preferred embodiments of the zoom lens of the present disclosure. According to a first aspect, the zoom lens consists of, in order from an object side to an image side: a first lens group G1 that has a positive refractive power; a middle group GM that includes a plurality of lens groups each moving by changing a spacing with an adjacent lens group during zooming; and a final lens group GE that remains stationary with respect to an image plane during zooming and has a positive refractive power. Among the plurality of lens groups, an image side movable lens group Gn, which is a lens group disposed closest to the image side, has a negative refractive power. The zoom lens satisfies Conditional Expression (1).

According to a second aspect of the present disclosure, the zoom lens consists of, in order from the object side to the image side: a first lens group G1 that has a positive refractive power; a middle group GM that includes a plurality of lens groups each moving by changing a spacing with an adjacent lens group during zooming; and a final lens group GE that remains stationary with respect to an image plane Sim during zooming and has a positive refractive power. Among the plurality of lens groups, an image side movable lens group Gn, which is a lens group disposed closest to the image side, has a negative refractive power. Assuming that a lateral magnification of each lens group in the middle group GM at a wide angle end in a state in which the infinite distance object is in focus is OW, and a lateral magnification of each lens group in the middle group GM at a telephoto end in a state in which the infinite distance object is in focus is PT, among the lens groups in the middle group GM, a lens group having a maximum |βT/βW| is the image side movable lens group Gn.

Next, examples of the zoom lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

FIG. 1 shows a configuration and movement loci of a zoom lens of Example 1, and an illustration method and a configuration thereof are as described above. Therefore, some description is not repeated herein. The zoom lens of Example 1 consists of, in order from the object side to the image side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power. During zooming, the first lens group G1 and the fifth lens group G5 remain stationary with respect to the image plane Sim, and the second lens group G2, the third lens group G3, and the fourth lens group G4 move along the optical axis Z by changing the spacing from the adjacent lens groups. The middle group GM consists of the second lens group G2, the third lens group G3, and the fourth lens group G4. The final lens group GE consists of a fifth lens group G5. The focus group consists of the lens L14.

Regarding the zoom lens of Example 1, Tables 1A and 1B show basic lens data, Table 2 shows specifications, and Table 3 shows variable surface spacings. Here, the basic lens data is divided into two tables, Table 1A and Table 1B, to avoid lengthening of one table. Table 1A shows the first lens group G1 and the middle group GM, and Table 1B shows the fifth lens group G5 and an optical member PP. Tables 1A, 1B, and 2 show data in a state in which the infinite distance object is in focus.

Tables 1A and 1B are described as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each constituent element at the d line. The column of vd shows an Abbe number of each constituent element based on the d line. The column of θgF shows a partial dispersion ratio of each constituent element between the g line and the F line. The column of ED shows an effective diameter at the diameter of each surface.

In Tables 1A and 1B, the sign of the curvature radius of the convex surface facing toward the object side is positive and the sign of the curvature radius of the convex surface facing toward the image side is negative. In Table 1B, in a cell of a surface number of a surface corresponding to the aperture stop St, the surface number and a term of (St) are noted. Table 1B also shows the optical member PP. A value at the bottom cell of the column of D in Table 1B indicates a spacing between the image plane Sim and the surface closest to the image side in the table. In Table 1A, the symbol DD[ ] is used for each variable surface spacing during zooming, and the object side surface number of the spacing is given in [ ] and is noted in the column of D.

Table 2 shows the zoom ratio Zr, the focal length f, and the open F number FNo., and the maximum total angle of view 2ω are shown based on the d line. (°) in the cell of 2ω indicates that the unit thereof is a degree. Table 3 shows the variable surface spacing during zooming. In Tables 2 and 3, the WIDE and TELE columns show the values in the wide angle end state and the values in the telephoto end state, respectively.

In the data of each table, degrees are used as a unit of an angle, and millimeters (mm) are used as a unit of a length, but appropriate different units may be used since the optical system can be used even in a case where the system is enlarged or reduced in proportion. Further, each of the following tables shows numerical values rounded off to predetermined decimal places.

TABLE 1A

| | | Example 1 | | | | |
|---|---|---|---|---|---|---|
| Sn | R | D | Nd | vd | θgF | ED |
| 1 | 249.4775 | 2.418 | 1.48749 | 70.24 | 0.53007 | 63.00 |
| 2 | 58.7428 | 1.516 | | | | 59.04 |
| 3 | 58.8521 | 4.613 | 1.85000 | 23.06 | 0.62585 | 58.82 |
| 4 | 96.2814 | 7.354 | | | | 58.11 |
| 5 | −163.0286 | 2.001 | 1.85150 | 40.78 | 0.56958 | 58.01 |
| 6 | 260.3096 | 0.966 | | | | 57.71 |
| 7 | 271.9161 | 6.469 | 1.59282 | 68.62 | 0.54414 | 57.80 |
| 8 | −117.3288 | 12.460 | | | | 57.80 |
| 9 | 110.7085 | 2.260 | 1.84999 | 22.50 | 0.62921 | 59.67 |
| 10 | 57.3436 | 9.961 | 1.43875 | 94.66 | 0.53402 | 58.41 |
| 11 | −905.2974 | 0.121 | | | | 58.51 |
| 12 | 69.0919 | 6.855 | 1.75862 | 52.14 | 0.54802 | 59.02 |
| 13 | 341.9106 | DD[13] | | | | 58.48 |
| 14 | 105.8264 | 3.019 | 1.51500 | 78.97 | 0.53862 | 38.50 |
| 15 | −2383.8024 | DD[15] | | | | 37.91 |
| 16 | 120.3250 | 3.834 | 1.58781 | 39.22 | 0.58070 | 35.00 |
| 17 | −114.2799 | 1.200 | 1.90000 | 29.29 | 0.60133 | 34.06 |
| 18 | 41.6814 | 5.043 | | | | 31.83 |
| 19 | −81.1920 | 1.200 | 1.48411 | 86.99 | 0.53700 | 31.83 |
| 20 | 120.3496 | 0.120 | | | | 32.35 |
| 21 | 72.3078 | 5.238 | 1.83310 | 23.35 | 0.62336 | 32.65 |
| 22 | −68.7154 | 1.201 | 1.85067 | 42.93 | 0.56414 | 32.60 |
| 23 | −214.0806 | DD[23] | | | | 32.53 |
| 24 | −76.0385 | 1.010 | 1.82862 | 31.22 | 0.59717 | 27.56 |
| 25 | 31.7528 | 4.323 | 1.90000 | 20.01 | 0.64188 | 27.51 |
| 26 | 409.8095 | 0.502 | | | | 27.55 |
| 27 | −422.3158 | 1.001 | 1.90000 | 34.08 | 0.58662 | 27.55 |
| 28 | 157.3193 | DD[28] | | | | 27.72 |

TABLE 1B

| | | Example 1 | | | | |
|---|---|---|---|---|---|---|
| Sn | R | D | Nd | vd | θgF | ED |
| 29 (St) | ∞ | 2.000 | | | | 29.90 |
| 30 | 55.6100 | 3.984 | 1.76966 | 50.64 | 0.55032 | 30.82 |
| 31 | −259.7606 | 0.120 | | | | 30.66 |
| 32 | 31.3186 | 9.148 | 1.44070 | 94.33 | 0.53415 | 29.36 |
| 33 | −31.3833 | 1.215 | 1.93599 | 26.63 | 0.60964 | 28.23 |
| 34 | 99.4054 | 7.155 | | | | 27.68 |
| 35 | 405.5298 | 4.407 | 1.84667 | 23.79 | 0.61771 | 28.15 |
| 36 | −38.5614 | 5.858 | | | | 28.35 |
| 37 | 30.0914 | 4.365 | 1.58034 | 39.97 | 0.57941 | 23.51 |
| 38 | −137.1588 | 1.200 | 1.92253 | 35.65 | 0.58151 | 22.62 |
| 39 | 19.4709 | 1.223 | | | | 20.59 |
| 40 | 22.4227 | 3.115 | 1.60584 | 42.31 | 0.57380 | 20.82 |
| 41 | 63.5554 | 9.146 | | | | 20.50 |
| 42 | −20.2700 | 1.201 | 1.71918 | 55.54 | 0.54385 | 19.55 |
| 43 | −38.9024 | 5.000 | | | | 20.38 |
| 44 | ∞ | 2.000 | 1.51633 | 64.14 | 0.53531 | 21.80 |
| 45 | ∞ | 30.983 | | | | 22.10 |

TABLE 2

| Example 1 | | |
| --- | --- | --- |
| | WIDE | TELE |
| Zr | 1.0 | 4.92 |
| f | 49.06 | 241.37 |
| FNo. | 3.33 | 4.29 |
| 2ω(°) | 33.8 | 6.6 |

TABLE 3

| Example 1 | | |
| --- | --- | --- |
| | WIDE | TELE |
| DD[13] | 0.937 | 42.165 |
| DD[15] | 1.200 | 0.855 |
| DD[23] | 4.659 | 29.895 |
| DD[28] | 67.431 | 1.312 |

Figure 5:
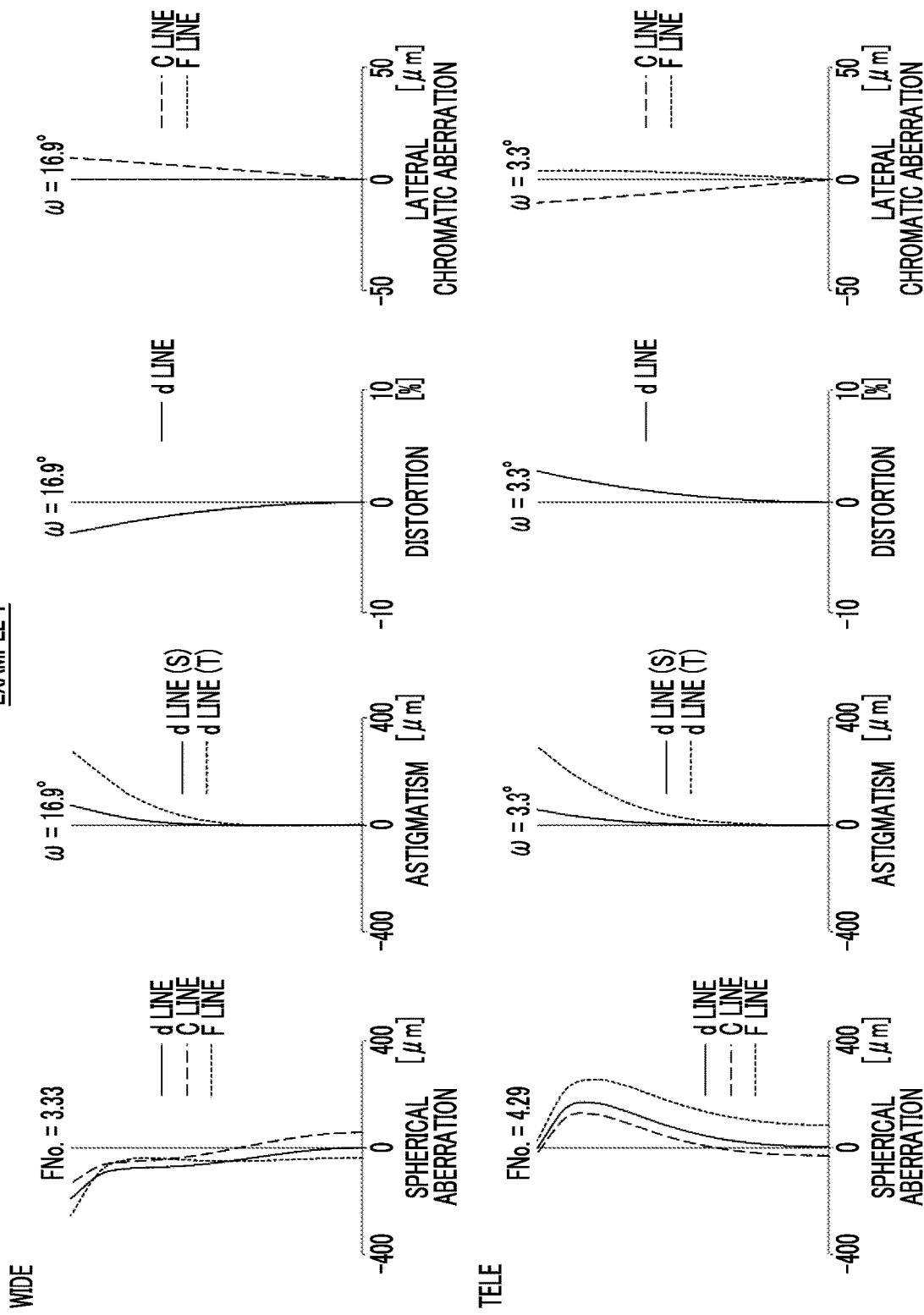
FIG. 5 is a diagram showing aberrations of the zoom lens of Example 1.

FIG. 5 is a diagram showing aberrations of the zoom lens of Example 1 in a state where the infinite distance object is in focus. FIG. 5 shows spherical aberration, astigmatism, distortion, and lateral chromatic aberration, in order from the left side. In FIG. 5, the upper part labeled "WIDE" shows aberrations at the wide angle end state, and the lower part labeled "TELE" shows aberrations at the telephoto end state. In spherical aberration diagram, aberrations at the d line, the C line, and the F line are indicated by the solid line, the long broken line, and the short broken line, respectively. In the astigmatism diagram, aberration in the sagittal direction at the d line is indicated by the solid line, and aberration in the tangential direction at the d line is indicated by the short broken line. In distortion diagram, aberration at the d line is indicated by the solid line. In lateral chromatic aberration diagram, aberrations at the C line, and the F line are respectively indicated by the long broken line, and the short broken line. In spherical aberration diagram, the value of the open F number is shown after FNo.=. In other aberration diagrams, the value of the maximum half angle of view is shown after ω=.

Symbols, meanings, description methods, and illustration methods of the respective data pieces according to Example 1 are the same as those in the following examples unless otherwise specified. Therefore, in the following description, repeated description will be omitted.

Example 2

Figure 6:
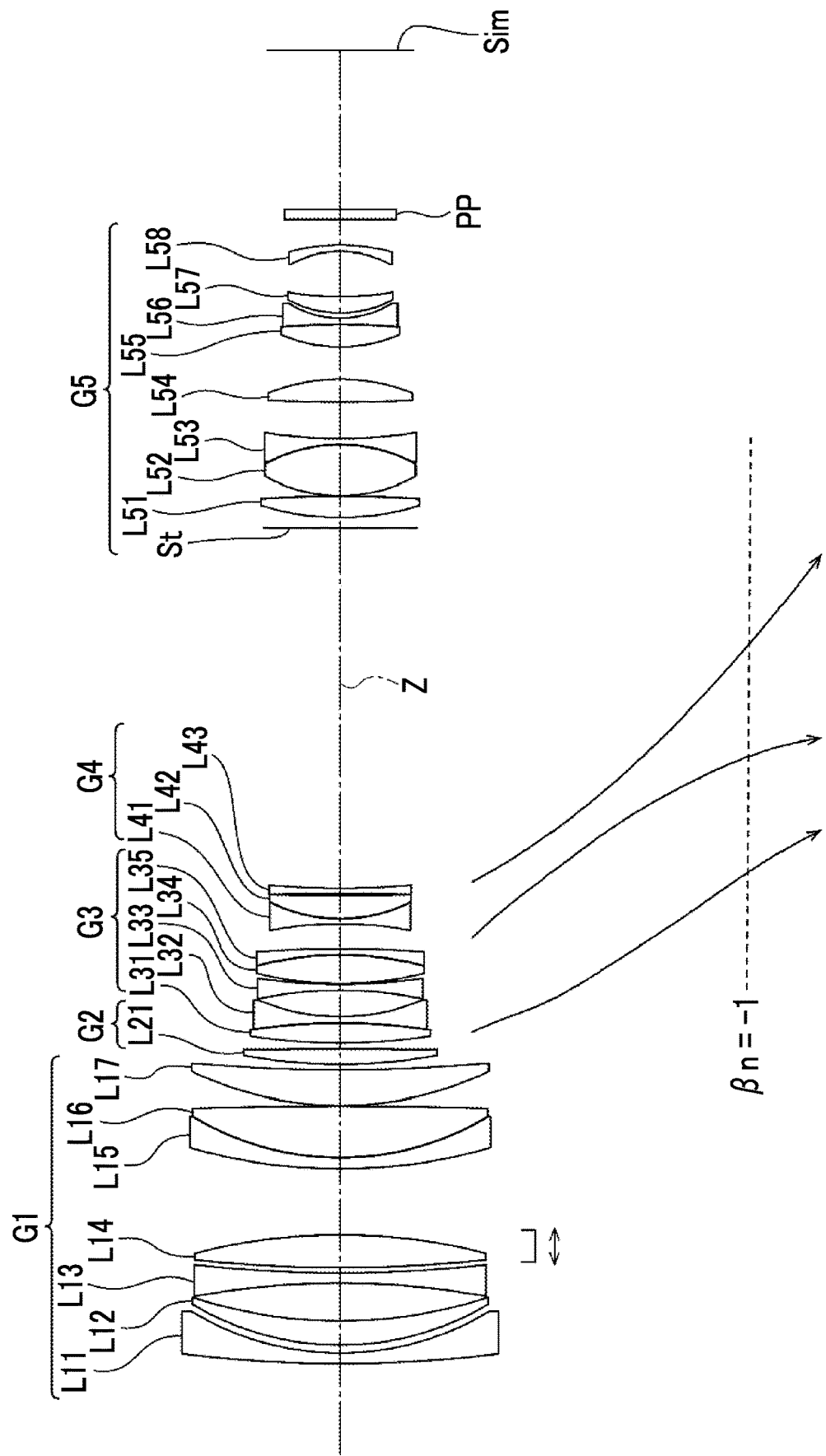
FIG. 6 is a cross-sectional view of a configuration of a zoom lens of Example 2 and a diagram showing movement loci thereof.

FIG. 6 shows a configuration and movement loci of the zoom lens of Example 2. The zoom lens of Example 2 consists of, in order from the object side to the image side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power.

The first lens group G1 consists of seven lenses L11 to L17 in order from the object side to the image side. The second lens group G2 consists of one lens L21. The third lens group G3 consists of five lenses L31 to L35 in order from the object side to the image side. The fourth lens group G4 consists of three lenses L41 to L43 in order from the object side to the image side. The fifth lens group G5 consists of an aperture stop St and eight lenses L51 to L58 in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacing from the adjacent lens groups. The middle group GM consists of the second lens group G2, the third lens group G3, and the fourth lens group G4. The final lens group GE consists of a fifth lens group G5. The focus group consists of the lens L14.

Figure 7:
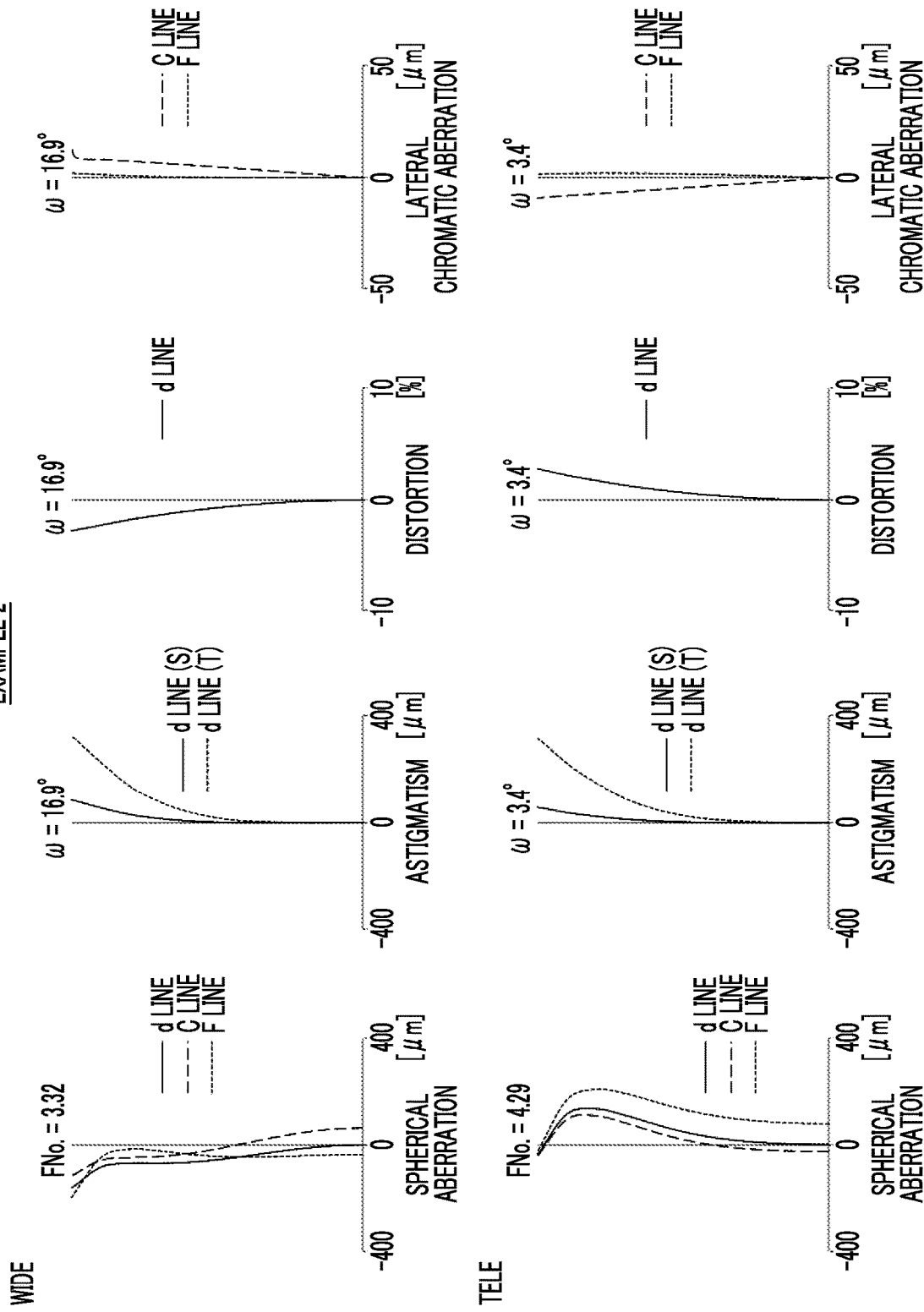
FIG. 7 is a diagram showing aberrations of the zoom lens of Example 2.

Regarding the zoom lens of Example 2, Tables 4A and 4B show basic lens data, Table 5 shows specifications, and Table 6 shows variable surface spacings. FIG. 7 shows aberration diagrams.

TABLE 4A

| Example 2 | | | | | | |
| --- | --- | --- | --- | --- | --- | --- |
| Sn | R | D | Nd | vd | θgF | ED |
| 1 | 254.1882 | 2.100 | 1.48749 | 70.24 | 0.53007 | 63.00 |
| 2 | 58.2416 | 1.554 | | | | 59.14 |
| 3 | 58.6470 | 4.700 | 1.85000 | 23.34 | 0.62381 | 58.93 |
| 4 | 96.8532 | 7.324 | | | | 58.19 |
| 5 | −164.8476 | 2.001 | 1.85150 | 40.78 | 0.56958 | 58.04 |
| 6 | 265.7294 | 1.065 | | | | 57.71 |
| 7 | 286.3631 | 6.353 | 1.59282 | 68.62 | 0.54414 | 57.80 |
| 8 | −118.2394 | 12.762 | | | | 57.80 |
| 9 | 110.6701 | 2.200 | 1.84997 | 22.51 | 0.62919 | 59.74 |
| 10 | 57.9528 | 9.961 | 1.43875 | 94.66 | 0.53402 | 58.51 |
| 11 | −1004.8879 | 0.121 | | | | 58.62 |
| 12 | 69.9958 | 6.855 | 1.75498 | 52.50 | 0.54750 | 59.10 |
| 13 | 336.8474 | DD[13] | | | | 58.54 |
| 14 | 110.1139 | 2.942 | 1.51500 | 78.97 | 0.53862 | 38.50 |
| 15 | −2770.8207 | DD[15] | | | | 37.94 |
| 16 | 120.3378 | 3.897 | 1.55847 | 44.04 | 0.57183 | 35.09 |
| 17 | −113.3991 | 1.200 | 1.90000 | 28.32 | 0.60445 | 34.29 |
| 18 | 41.7218 | 5.159 | | | | 32.10 |
| 19 | −80.1586 | 1.200 | 1.47886 | 87.88 | 0.53665 | 32.11 |
| 20 | 121.2824 | 0.120 | | | | 32.77 |
| 21 | 70.5103 | 5.563 | 1.82883 | 23.56 | 0.62170 | 33.15 |
| 22 | −65.7100 | 1.211 | 1.77091 | 50.91 | 0.54978 | 33.13 |
| 23 | −211.9447 | DD[23] | | | | 33.04 |
| 24 | −77.7117 | 1.010 | 1.83136 | 31.53 | 0.59613 | 27.81 |
| 25 | 31.5682 | 4.481 | 1.89998 | 20.00 | 0.64193 | 27.86 |
| 26 | 442.7455 | 0.450 | | | | 27.90 |
| 27 | −497.0849 | 1.001 | 1.90000 | 31.05 | 0.59579 | 27.90 |
| 28 | 155.3131 | DD[28] | | | | 28.05 |

TABLE 4B

| Example 2 | | | | | | |
| --- | --- | --- | --- | --- | --- | --- |
| Sn | R | D | Nd | vd | θgF | ED |
| 29 (St) | ∞ | 2.000 | | | | 30.36 |
| 30 | 55.1754 | 4.107 | 1.74970 | 50.67 | 0.55103 | 31.35 |
| 31 | −256.5981 | 0.120 | | | | 31.18 |
| 32 | 31.6665 | 9.858 | 1.43896 | 94.62 | 0.53403 | 29.83 |
| 33 | −31.4857 | 1.201 | 1.93599 | 26.40 | 0.61088 | 28.37 |
| 34 | 99.4938 | 7.152 | | | | 27.82 |
| 35 | 386.1377 | 4.399 | 1.84667 | 23.79 | 0.61771 | 28.32 |
| 36 | −38.7188 | 6.138 | | | | 28.51 |
| 37 | 29.9145 | 4.377 | 1.58274 | 39.73 | 0.57982 | 23.46 |
| 38 | −125.3588 | 1.202 | 1.92432 | 34.82 | 0.58383 | 22.59 |
| 39 | 19.3178 | 1.038 | | | | 20.52 |
| 40 | 22.0847 | 3.157 | 1.59975 | 38.03 | 0.58366 | 20.71 |
| 41 | 63.5914 | 8.770 | | | | 20.39 |
| 42 | −20.3719 | 1.201 | 1.73901 | 54.10 | 0.54520 | 19.49 |
| 43 | −38.8831 | 5.000 | | | | 20.33 |
| 44 | ∞ | 2.000 | 1.51633 | 64.14 | 0.53531 | 21.77 |
| 45 | ∞ | 30.911 | | | | 22.07 |

TABLE 5

Example 2

|  | WIDE | TELE |
|---|---|---|
| Zr | 1.0 | 4.9 |
| f | 49.23 | 241.24 |
| FNo. | 3.32 | 4.29 |
| 2ω(°) | 33.8 | 6.8 |

TABLE 6

Example 2

|  | WIDE | TELE |
|---|---|---|
| DD[13] | 1.090 | 43.156 |
| DD[15] | 1.200 | 0.860 |
| DD[23] | 4.728 | 31.308 |
| DD[28] | 70.155 | 1.849 |

Example 3

Figure 8:
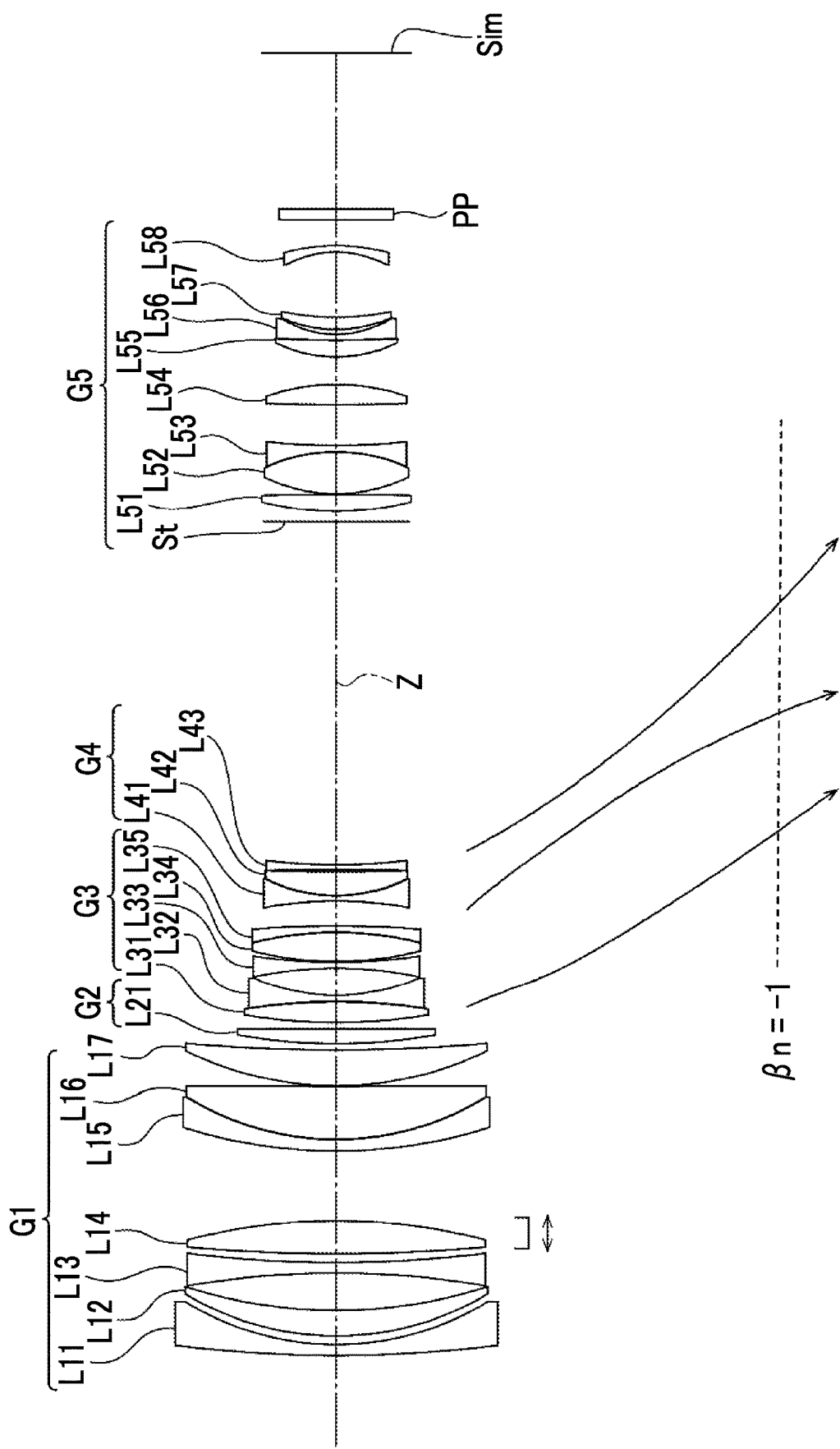
FIG. 8 is a cross-sectional view of a configuration of a zoom lens of Example 3 and a diagram showing movement loci thereof.

FIG. 8 shows a configuration and movement loci of the zoom lens of Example 3. The zoom lens of Example 3 consists of, in order from the object side to the image side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power.

The first lens group G1 consists of seven lenses L11 to L17 in order from the object side to the image side. The second lens group G2 consists of one lens L21. The third lens group G3 consists of five lenses L31 to L35 in order from the object side to the image side. The fourth lens group G4 consists of three lenses L41 to L43 in order from the object side to the image side. The fifth lens group G5 consists of an aperture stop St and eight lenses L51 to L58 in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacing from the adjacent lens groups. The middle group GM consists of the second lens group G2, the third lens group G3, and the fourth lens group G4. The final lens group GE consists of a fifth lens group G5. The focus group consists of the lens L14.

Figure 9:
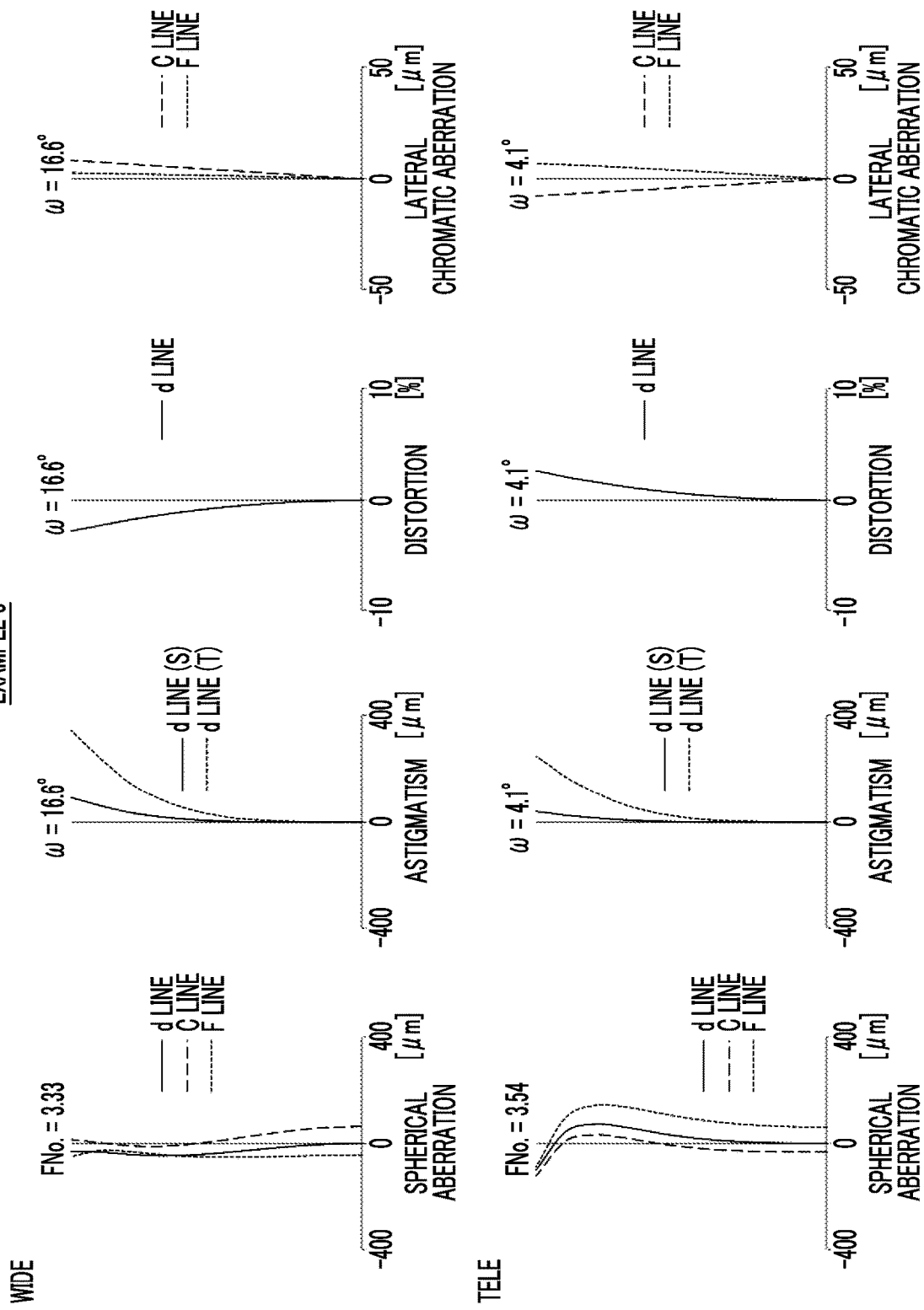
FIG. 9 is a diagram showing aberrations of the zoom lens of Example 3.

Regarding the zoom lens of Example 3, Tables 7A and 7B show basic lens data, Table 8 shows specifications, and Table 9 shows variable surface spacings. FIG. 9 shows aberration diagrams.

TABLE 7A

Example 3

| Sn | R | D | Nd | vd | θgF | ED |
|---|---|---|---|---|---|---|
| 1 | 257.7388 | 2.100 | 1.48749 | 70.24 | 0.53007 | 63.00 |
| 2 | 57.7359 | 1.599 |  |  |  | 59.15 |
| 3 | 58.2204 | 4.879 | 1.85000 | 24.08 | 0.62001 | 58.96 |
| 4 | 98.1193 | 7.128 |  |  |  | 58.25 |
| 5 | −175.7033 | 2.000 | 1.85150 | 40.78 | 0.56958 | 58.12 |
| 6 | 237.8422 | 1.676 |  |  |  | 57.69 |
| 7 | 332.3559 | 6.322 | 1.59263 | 68.66 | 0.54412 | 57.78 |
| 8 | −115.3150 | 13.336 |  |  |  | 58.10 |
| 9 | 101.4075 | 2.200 | 1.85000 | 23.15 | 0.62514 | 59.77 |
| 10 | 56.7223 | 9.961 | 1.43875 | 94.66 | 0.53402 | 58.39 |
| 11 | 4059.1040 | 0.121 |  |  |  | 58.44 |
| 12 | 68.5899 | 6.855 | 1.68820 | 57.09 | 0.54315 | 58.74 |
| 13 | 348.7493 | DD[13] |  |  |  | 58.23 |
| 14 | 116.0851 | 2.849 | 1.53014 | 75.91 | 0.53896 | 38.50 |
| 15 | −2628.0588 | DD[15] |  |  |  | 38.00 |
| 16 | 117.6595 | 3.979 | 1.51890 | 51.46 | 0.55838 | 35.21 |
| 17 | −109.5016 | 1.200 | 1.88661 | 28.40 | 0.60451 | 34.24 |
| 18 | 40.8133 | 5.171 |  |  |  | 31.83 |
| 19 | −80.9842 | 1.200 | 1.43875 | 94.66 | 0.53402 | 31.84 |
| 20 | 117.1014 | 0.120 |  |  |  | 32.44 |
| 21 | 67.5604 | 5.583 | 1.85000 | 23.78 | 0.62062 | 32.80 |
| 22 | −66.5919 | 1.210 | 1.75334 | 52.67 | 0.54726 | 32.73 |
| 23 | −218.4409 | DD[23] |  |  |  | 32.52 |
| 24 | −80.9413 | 1.010 | 1.80679 | 32.19 | 0.59478 | 28.24 |
| 25 | 31.1981 | 4.568 | 1.89861 | 21.06 | 0.63679 | 27.65 |
| 26 | 473.7516 | 0.391 |  |  |  | 27.42 |
| 27 | −772.7982 | 1.000 | 1.90000 | 28.30 | 0.60452 | 27.41 |
| 28 | 129.8400 | DD[28] |  |  |  | 27.22 |

TABLE 7B

Example 3

| Sn | R | D | Nd | vd | θgF | ED |
|---|---|---|---|---|---|---|
| 29 (St) | ∞ | 2.000 |  |  |  | 28.36 |
| 30 | 60.5310 | 3.246 | 1.83207 | 44.79 | 0.56073 | 29.12 |
| 31 | −548.4790 | 0.120 |  |  |  | 28.97 |
| 32 | 32.6248 | 7.996 | 1.43875 | 94.66 | 0.53402 | 28.10 |
| 33 | −33.8852 | 1.200 | 1.93600 | 26.30 | 0.61136 | 27.20 |
| 34 | 125.0269 | 7.771 |  |  |  | 26.78 |
| 35 | 342.4640 | 3.859 | 1.84667 | 23.79 | 0.61771 | 27.10 |
| 36 | −43.1438 | 5.109 |  |  |  | 27.27 |
| 37 | 27.5036 | 3.145 | 1.65172 | 36.46 | 0.58656 | 23.75 |
| 38 | 199.1497 | 1.200 | 1.95375 | 32.32 | 0.59015 | 23.29 |
| 39 | 21.0529 | 0.884 |  |  |  | 21.38 |
| 40 | 27.5074 | 2.316 | 1.61199 | 54.54 | 0.54913 | 21.39 |
| 41 | 52.1133 | 12.532 |  |  |  | 21.08 |
| 42 | −20.7164 | 1.201 | 1.72667 | 55.17 | 0.54402 | 19.64 |
| 43 | −40.3501 | 5.000 |  |  |  | 20.47 |
| 44 | ∞ | 2.000 | 1.51633 | 64.14 | 0.53531 | 21.91 |
| 45 | ∞ | 29.747 |  |  |  | 22.21 |

TABLE 8

Example 3

| | WIDE | TELE |
|---|---|---|
| Zr | 1.0 | 4.0 |
| f | 49.91 | 199.64 |
| FNo. | 3.33 | 3.54 |
| 2ω(°) | 33.2 | 8.2 |

TABLE 9

Example 3

| | WIDE | TELE |
|---|---|---|
| DD[13] | 1.186 | 45.043 |
| DD[15] | 1.200 | 1.039 |
| DD[23] | 4.739 | 23.950 |
| DD[28] | 65.445 | 2.538 |

Example 4

Figure 10:
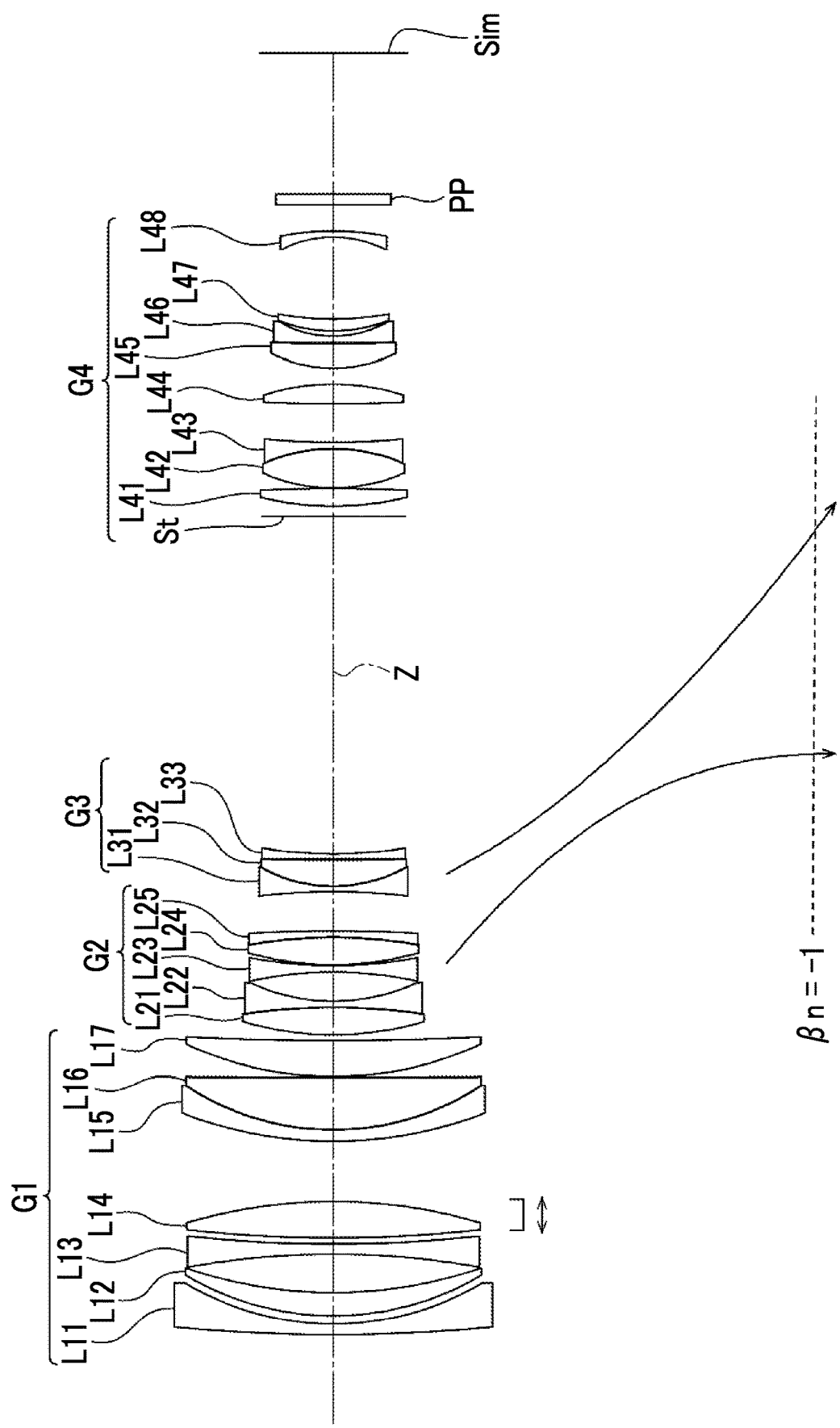
FIG. 10 is a cross-sectional view of a configuration of a zoom lens of Example 4 and a diagram showing movement loci thereof.
Figure 11:
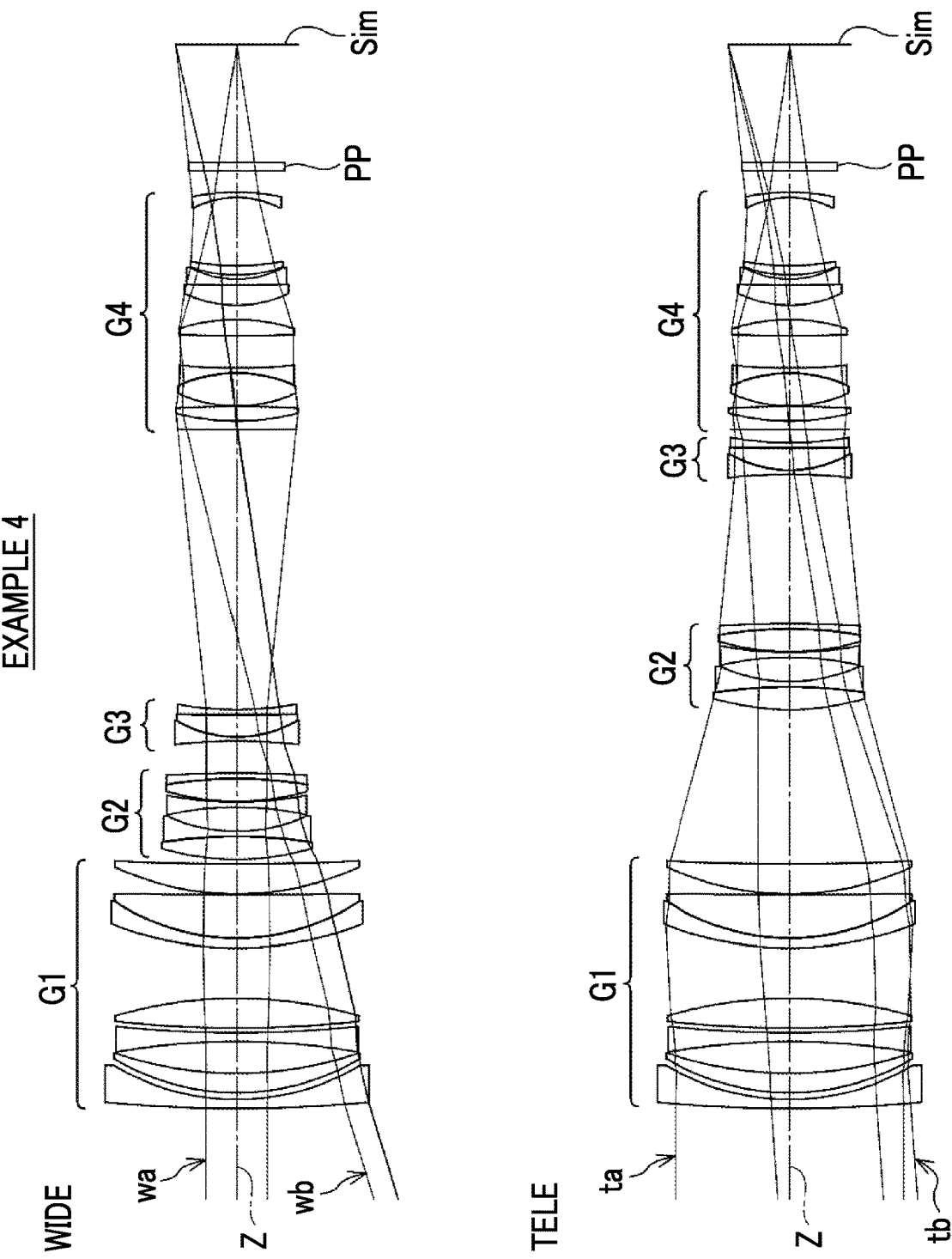
FIG. 11 is a diagram showing a configuration and luminous flux in each zooming state of the zoom lens of Example 4.

FIG. 10 shows a configuration and movement loci of the zoom lens of Example 4. FIG. 11 shows a cross-sectional view and a luminous flux of the configuration of the zoom lens of Example 4 in each zooming state. The illustration method of FIG. 11 is the same as that of FIG. 2. The zoom lens shown in Example 4 consists of, in order from the object side to the image side, a first lens group G1 having a positive refractive power, a second lens group G2 having a negative refractive power, a third lens group G3 having a negative refractive power, and a fourth lens group G4 having a positive refractive power.

The first lens group G1 consists of seven lenses L11 to L17 in order from the object side to the image side. The second lens group G2 consists of five lenses L21 to L25 in order from the object side to the image side. The third lens group G3 consists of three lenses L31 to L33 in order from the object side to the image side. The fourth lens group G4 consists of the aperture stop St and eight lenses L41 to L48 in order from the object side to the image side.

During zooming, the first lens group G1 and the fourth lens group G4 remain stationary with respect to the image plane Sim, and the second lens group G2 and the third lens group G3 move along the optical axis Z by changing the spacing from the adjacent lens groups. The middle group GM consists of the second lens group G2 and the third lens group G3. The final lens group GE consists of a fourth lens group G4. The focus group consists of the lens L14.

Figure 12:
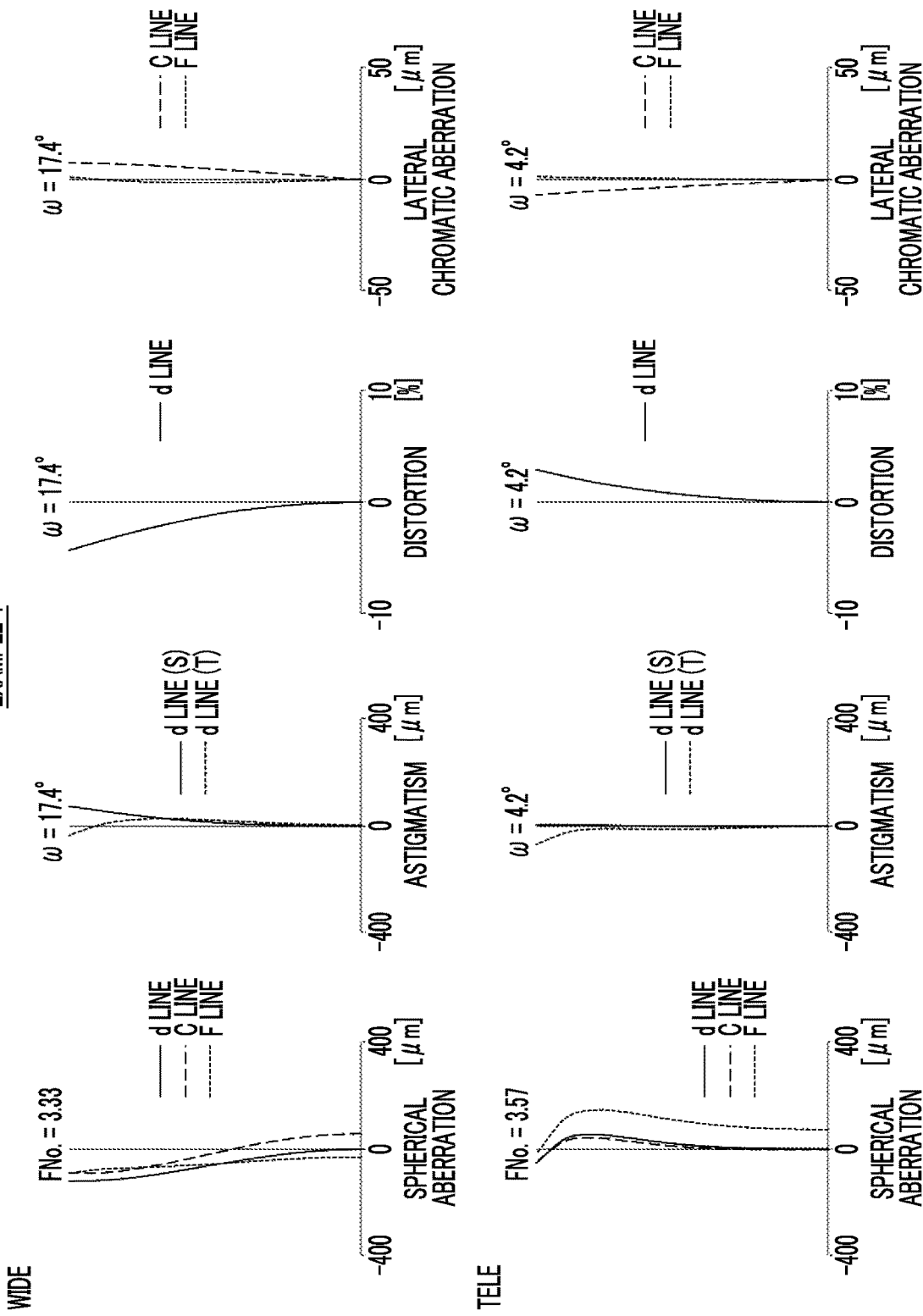
FIG. 12 is a diagram showing aberrations of the zoom lens of Example 4.

Regarding the zoom lens of Example 4, Tables 10A and 10B show basic lens data, Table 11 shows specifications, and Table 12 shows variable surface spacings. FIG. 12 shows aberration diagrams.

TABLE 10A

Example 4

| Sn | R | D | Nd | vd | θgF | ED |
|---|---|---|---|---|---|---|
| 1 | 332.7467 | 2.100 | 1.48749 | 70.24 | 0.53007 | 62.50 |
| 2 | 58.0280 | 1.577 | | | | 58.48 |
| 3 | 58.0348 | 4.482 | 1.82767 | 23.62 | 0.62125 | 58.25 |
| 4 | 92.2299 | 7.345 | | | | 57.51 |
| 5 | −169.0852 | 2.000 | 1.85150 | 40.78 | 0.56958 | 57.37 |
| 6 | 275.4204 | 1.142 | | | | 57.12 |
| 7 | 271.2428 | 6.985 | 1.52654 | 79.82 | 0.53979 | 57.24 |
| 8 | −103.7184 | 11.536 | | | | 57.60 |
| 9 | 84.2313 | 2.201 | 1.84787 | 23.45 | 0.62297 | 59.55 |
| 10 | 53.6814 | 10.046 | 1.43875 | 94.66 | 0.53402 | 58.01 |
| 11 | 3646.8828 | 0.120 | | | | 57.98 |
| 12 | 70.4834 | 6.920 | 1.68920 | 54.79 | 0.54586 | 57.82 |
| 13 | 608.3105 | DD[13] | | | | 57.30 |
| 14 | 62.8953 | 5.288 | 1.53763 | 47.95 | 0.56466 | 35.66 |
| 15 | −121.7422 | 1.200 | 1.85000 | 25.78 | 0.61485 | 34.84 |
| 16 | 39.8750 | 5.602 | | | | 32.44 |
| 17 | −75.7941 | 1.200 | 1.46597 | 90.06 | 0.53581 | 32.43 |
| 18 | 90.8951 | 0.119 | | | | 33.01 |
| 19 | 61.3464 | 5.293 | 1.83943 | 23.03 | 0.62582 | 33.35 |
| 20 | −96.3467 | 1.201 | 1.84142 | 43.86 | 0.56245 | 33.25 |
| 21 | −327.2169 | DD[21] | | | | 33.11 |
| 22 | −130.0849 | 1.010 | 1.79192 | 48.80 | 0.55318 | 29.24 |
| 23 | 29.4876 | 4.988 | 1.89709 | 29.80 | 0.59979 | 28.47 |
| 24 | 459.6532 | 0.283 | | | | 28.17 |
| 25 | −5545.9403 | 1.000 | 1.90000 | 38.00 | 0.57547 | 28.16 |
| 26 | 82.2172 | DD[26] | | | | 27.81 |

TABLE 10B

Example 4

| Sn | R | D | Nd | vd | θgF | ED |
|---|---|---|---|---|---|---|
| 27 (St) | ∞ | 2.000 | | | | 28.13 |
| 28 | 61.3380 | 3.351 | 1.80033 | 47.97 | 0.55479 | 28.86 |
| 29 | −313.3330 | 0.121 | | | | 28.73 |
| 30 | 34.6721 | 7.546 | 1.43875 | 94.66 | 0.53402 | 27.88 |
| 31 | −35.0221 | 1.200 | 1.93599 | 27.52 | 0.60615 | 27.05 |
| 32 | 148.0214 | 7.456 | | | | 26.65 |
| 33 | 366.0557 | 3.716 | 1.84667 | 23.79 | 0.61771 | 27.17 |
| 34 | −45.3661 | 3.110 | | | | 27.33 |
| 35 | 28.0601 | 4.656 | 1.53786 | 56.53 | 0.54843 | 24.61 |
| 36 | 354.6058 | 1.392 | 1.95375 | 32.32 | 0.59015 | 23.51 |
| 37 | 22.1048 | 1.027 | | | | 21.71 |
| 38 | 31.0358 | 2.229 | 1.72944 | 28.53 | 0.60779 | 21.74 |
| 39 | 61.7411 | 15.731 | | | | 21.49 |
| 40 | −22.9013 | 1.199 | 1.59114 | 44.96 | 0.56878 | 20.20 |
| 41 | −54.0501 | 5.000 | | | | 20.94 |
| 42 | ∞ | 2.000 | 1.51633 | 64.14 | 0.53531 | 22.35 |
| 43 | ∞ | 27.237 | | | | 22.66 |

TABLE 11

Example 4

| | WIDE | TELE |
|---|---|---|
| Zr | 1.0 | 4.0 |
| f | 48.27 | 193.09 |
| FNo. | 3.33 | 3.57 |
| 2ω(°) | 34.8 | 8.4 |

TABLE 12

Example 4

| | WIDE | TELE |
|---|---|---|
| DD[13] | 1.068 | 35.796 |
| DD[21] | 7.574 | 34.644 |
| DD[26] | 64.870 | 3.072 |

Example 5

Figure 13:
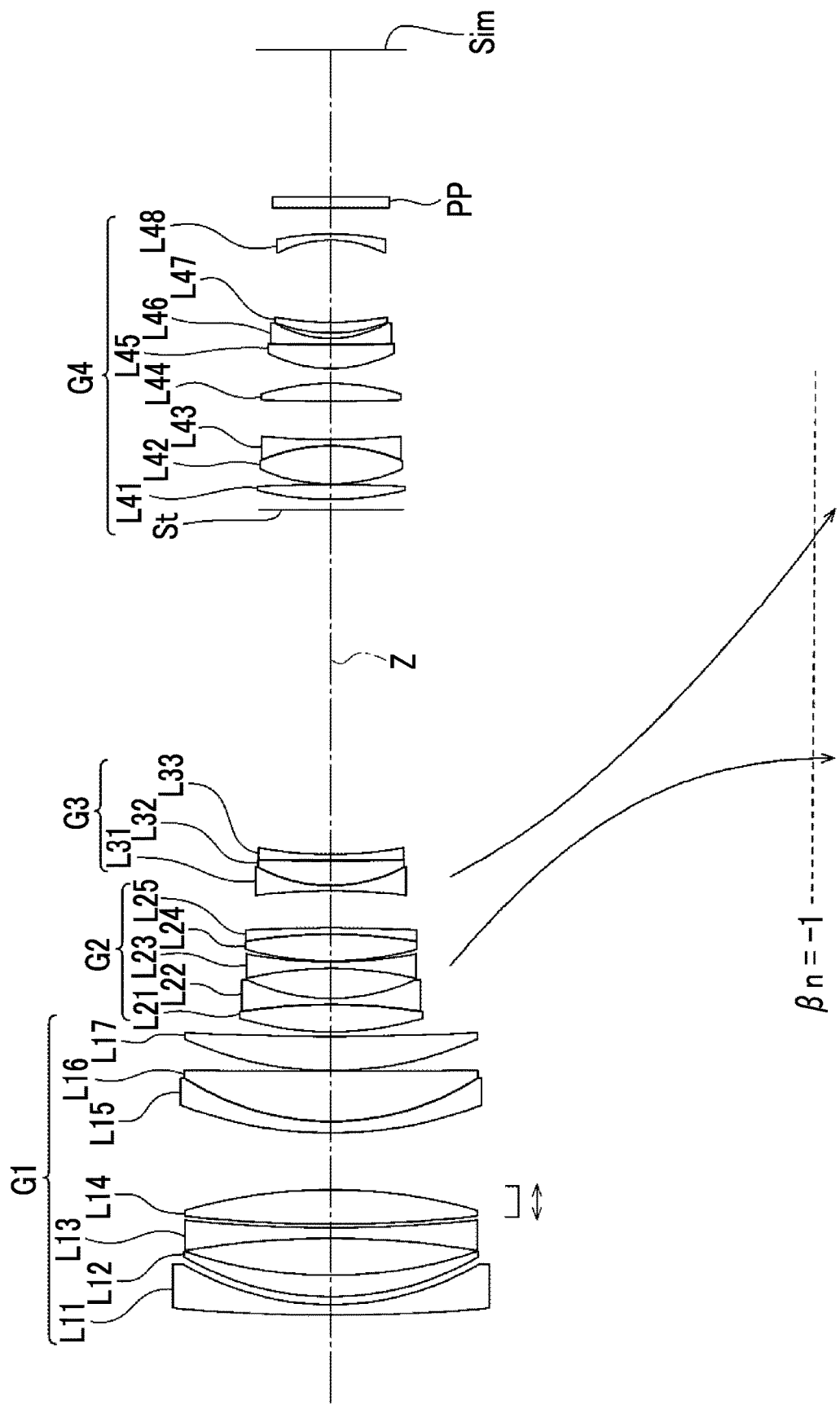
FIG. 13 is a cross-sectional view of a configuration of a zoom lens of Example 5 and a diagram showing movement loci thereof.

FIG. 13 shows a configuration and movement loci of the zoom lens of Example 5. The zoom lens shown in Example 5 consists of, in order from the object side to the image side, a first lens group G1 having a positive refractive power, a second lens group G2 having a negative refractive power, a third lens group G3 having a negative refractive power, and a fourth lens group G4 having a positive refractive power.

The first lens group G1 consists of seven lenses L11 to L17 in order from the object side to the image side. The second lens group G2 consists of five lenses L21 to L25 in order from the object side to the image side. The third lens group G3 consists of three lenses L31 to L33 in order from the object side to the image side. The fourth lens group G4 consists of the aperture stop St and eight lenses L41 to L48 in order from the object side to the image side.

During zooming, the first lens group G1 and the fourth lens group G4 remain stationary with respect to the image plane Sim, and the second lens group G2 and the third lens group G3 move along the optical axis Z by changing the spacing from the adjacent lens groups. The middle group GM consists of the second lens group G2 and the third lens group G3. The final lens group GE consists of a fourth lens group G4. The focus group consists of the lens L14.

Figure 14:
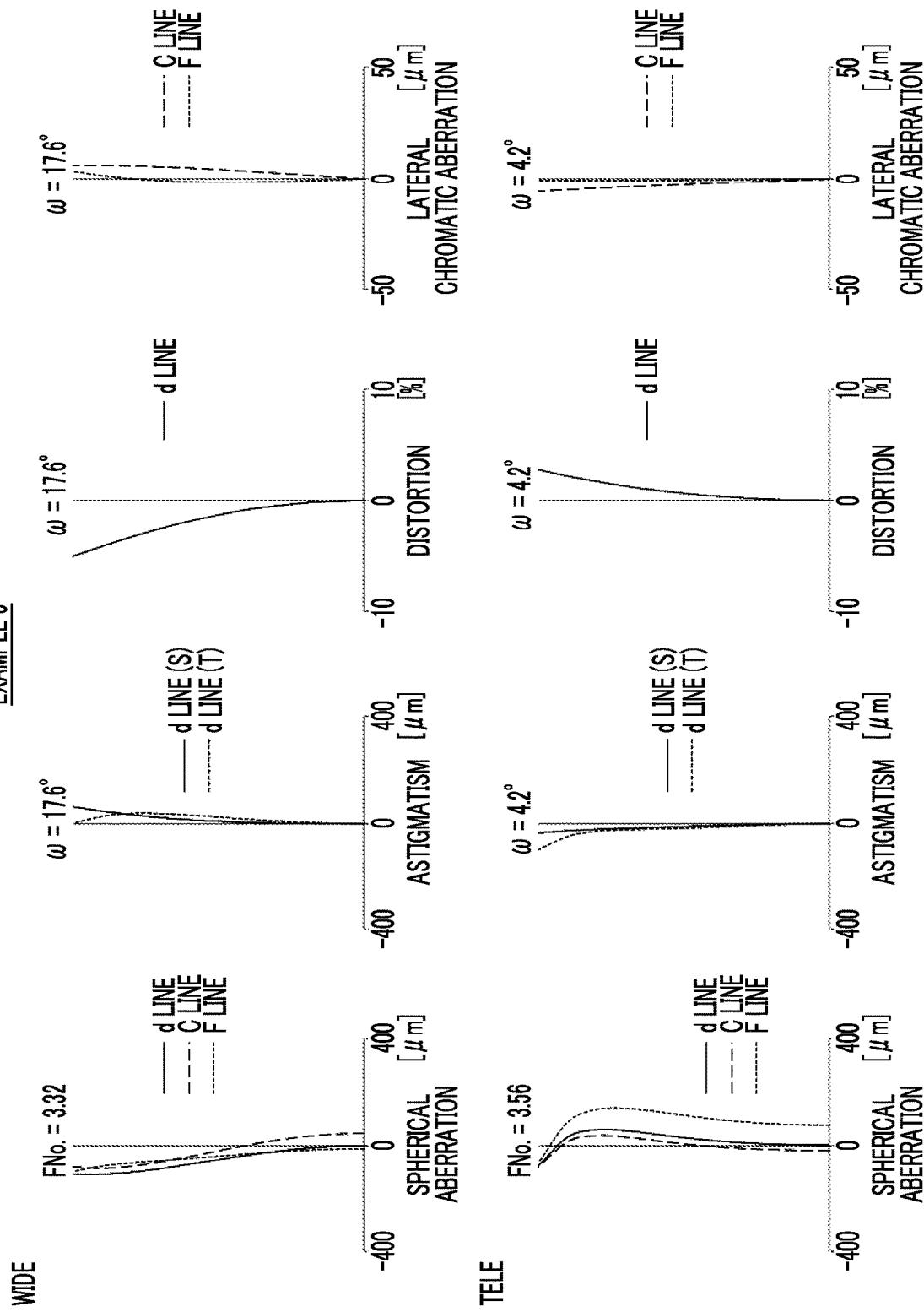
FIG. 14 is a diagram showing aberrations of the zoom lens of Example 5.

Regarding the zoom lens of Example 5, Tables 13A and 13B show basic lens data, Table 14 shows specifications, and Table 15 shows variable surface spacings. FIG. 14 shows aberration diagrams.

TABLE 13A

Example 5

| Sn | R | D | Nd | vd | θgF | ED |
|---|---|---|---|---|---|---|
| 1 | 322.9958 | 2.100 | 1.48749 | 70.24 | 0.53007 | 61.61 |
| 2 | 57.9481 | 1.484 | | | | 57.66 |
| 3 | 57.9395 | 4.077 | 1.84103 | 22.98 | 0.62622 | 57.42 |
| 4 | 91.8827 | 7.045 | | | | 56.92 |
| 5 | −172.2489 | 2.000 | 1.85150 | 40.78 | 0.56958 | 56.85 |
| 6 | 272.3731 | 0.723 | | | | 56.55 |
| 7 | 264.7048 | 6.518 | 1.52614 | 79.89 | 0.53976 | 56.61 |
| 8 | −105.1983 | 10.771 | | | | 56.89 |
| 9 | 83.3396 | 2.201 | 1.84770 | 22.76 | 0.62798 | 58.68 |
| 10 | 53.4319 | 9.635 | 1.43875 | 94.66 | 0.53402 | 57.18 |
| 11 | 2822.6861 | 0.120 | | | | 57.14 |
| 12 | 70.3074 | 6.545 | 1.68953 | 57.02 | 0.54318 | 56.95 |
| 13 | 561.4467 | DD[13] | | | | 56.49 |
| 14 | 62.7144 | 5.172 | 1.54660 | 46.26 | 0.56770 | 35.53 |
| 15 | −117.4499 | 1.200 | 1.84998 | 25.50 | 0.61587 | 34.79 |
| 16 | 39.6591 | 5.707 | | | | 32.37 |
| 17 | −71.1801 | 1.200 | 1.45372 | 92.13 | 0.53500 | 32.36 |
| 18 | 89.7825 | 0.144 | | | | 32.99 |
| 19 | 61.1253 | 5.122 | 1.84587 | 22.71 | 0.62826 | 33.35 |
| 20 | −101.6433 | 1.211 | 1.80879 | 47.12 | 0.55641 | 33.26 |
| 21 | −355.6222 | DD[21] | | | | 33.10 |
| 22 | −129.3291 | 1.010 | 1.78597 | 49.01 | 0.55293 | 29.25 |
| 23 | 30.6379 | 4.643 | 1.89891 | 29.61 | 0.60034 | 28.48 |
| 24 | 440.6266 | 0.294 | | | | 28.22 |
| 25 | −7685.5800 | 1.000 | 1.90000 | 38.00 | 0.57547 | 28.20 |
| 26 | 81.4299 | DD[26] | | | | 27.84 |

TABLE 13B

Example 5

| Sn | R | D | Nd | vd | θgF | ED |
|---|---|---|---|---|---|---|
| 27 (St) | ∞ | 2.000 | | | | 27.95 |
| 28 | 61.2227 | 2.790 | 1.80720 | 47.28 | 0.55611 | 28.70 |
| 29 | −310.5734 | 0.120 | | | | 28.62 |
| 30 | 34.5060 | 7.279 | 1.44209 | 94.10 | 0.53424 | 27.75 |
| 31 | −35.1359 | 1.200 | 1.93599 | 28.16 | 0.60409 | 27.02 |
| 32 | 148.9861 | 7.276 | | | | 26.59 |
| 33 | 375.7894 | 3.423 | 1.84667 | 23.79 | 0.61771 | 27.10 |
| 34 | −45.4772 | 2.954 | | | | 27.22 |
| 35 | 27.9761 | 4.442 | 1.52326 | 71.53 | 0.53558 | 24.51 |
| 36 | 295.6705 | 1.242 | 1.95375 | 32.32 | 0.59015 | 23.49 |
| 37 | 22.1099 | 1.020 | | | | 21.78 |
| 38 | 30.8662 | 2.064 | 1.71317 | 29.34 | 0.60550 | 21.80 |
| 39 | 62.6728 | 15.598 | | | | 21.60 |
| 40 | −23.4438 | 1.201 | 1.59461 | 65.44 | 0.54242 | 20.35 |
| 41 | −53.6425 | 5.000 | | | | 21.07 |
| 42 | ∞ | 2.000 | 1.51633 | 64.14 | 0.53531 | 22.42 |
| 43 | ∞ | 28.121 | | | | 22.72 |

TABLE 14

| Example 5 | | |
|---|---|---|
| | WIDE | TELE |
| Zr | 1.0 | 4.0 |
| f | 48.19 | 192.76 |
| FNo. | 3.32 | 3.56 |
| 2ω(°) | 35.2 | 8.4 |

TABLE 15

| Example 5 | | |
|---|---|---|
| | WIDE | TELE |
| DD[13] | 0.848 | 35.361 |
| DD[21] | 7.056 | 35.002 |
| DD[26] | 65.531 | 3.072 |

Table 16 shows the corresponding values of Conditional Expressions (1) to (13) of the zoom lenses of Examples 1 to 5. The reference numerals of the corresponding lenses are noted in parentheses below the corresponding values of Conditional Expressions (8), (12), and (13). The corresponding surface numbers are noted in parentheses below the corresponding values of Conditional Expression (10).

TABLE 16

| Expression Number | Conditional expression | Example 1 | Example 2 | Example 3 | Example 4 | Example 5 |
|---|---|---|---|---|---|---|
| (1) | βnT/βnW | 13.07 | 11.91 | 7.57 | 20.71 | 18.01 |
| (2) | \|(βnT/βnW)/(fT/fW)\| | 2.66 | 2.43 | 1.89 | 5.18 | 4.50 |
| (3) | βnW | −0.10 | −0.12 | −0.17 | −0.05 | −0.06 |
| (4) | βnT | −1.36 | −1.38 | −1.25 | −1.02 | −1.04 |
| (5) | βeW | −0.78 | −0.76 | −0.70 | −0.70 | −0.69 |
| (6) | fn/f1 | −0.47 | −0.47 | −0.47 | −0.61 | −0.61 |
| (7) | h1/hs | 1.88 | 1.85 | 1.99 | 1.92 | 1.93 |
| (8) | Ndn | 1.90000 (L43) | 1.90000 (L43) | 1.90000 (L43) | 1.90000 (L33) | 1.90000 (L33) |
| (9) | EDm/h1 | 0.68 | 0.68 | 0.68 | 0.66 | 0.66 |
| (10) | \|α\| | 27.95 (32nd surface) | 28.09 (32nd surface) | 25.50 (32nd surface) | 23.70 (30th surface) | 23.71 (30th surface) |
| (11) | Dα/Dsim | 0.067 | 0.068 | 0.061 | 0.062 | 0.056 |
| (12) | θgFm + 0.00180 × vm − 0.64833 | 0.04525 (L33) | 0.04650 (L33) | 0.05608 (L33) | 0.04959 (L24) | 0.05250 (L24) |
| (13) | v1p | 68.62 (L14) | 68.62 (L14) | 68.66 (L14) | 79.82 (L14) | 79.89 (L14) |

Table 17 shows lateral magnifications of the lens groups in the middle groups of the zoom lenses of Examples 1 to 5 at the wide angle end and the telephoto end. Table 17 shows ratios of the lateral magnifications of the lens groups in the middle group at the telephoto end to the lateral magnifications thereof at the wide angle end. The meanings of the symbols in Table 17 are as follows. β2W indicates a lateral magnification of the second lens group G2 at the wide angle end. β2T indicates a lateral magnification of the second lens group G2 at the telephoto end. β3W indicates a lateral magnification of the third lens group G3 at the wide angle end. β3T indicates a lateral magnification of the third lens group G3 at the telephoto end. β4W indicates a lateral magnification of the fourth lens group G4 at the wide angle end. β4T indicates a lateral magnification of the fourth lens group G4 at the telephoto end.

TABLE 17

| | Example 1 | Example 2 | Example 3 | Example 4 | Example 5 |
|---|---|---|---|---|---|
| β2W | 0.64 | 0.64 | 0.63 | 13.36 | 11.47 |
| β3W | 8.45 | 7.58 | 5.58 | −0.05 | −0.06 |
| β4W | −0.10 | −0.12 | −0.17 | — | — |
| β2T | 0.73 | 0.74 | 0.73 | 2.58 | 2.55 |
| β3T | 2.75 | 2.71 | 2.56 | −1.02 | −1.04 |
| β4T | −1.36 | −1.38 | −1.25 | — | — |
| \|β2T/β2W\| | 1.15 | 1.15 | 1.15 | 0.19 | 0.22 |
| \|β3T/β3W\| | 0.33 | 0.36 | 0.46 | 20.71 | 18.01 |
| \|β4T/β4W\| | 13.07 | 11.91 | 7.57 | — | — |

As can be seen from the data described above, the zoom lenses of Examples 1 to 5 each have a zoom ratio of 4 times or more and each have achieved a relatively high magnification while being configured to have a small size, and various aberrations are satisfactorily corrected. As a result, the zoom lenses each achieve high optical performance.

Figure 15:
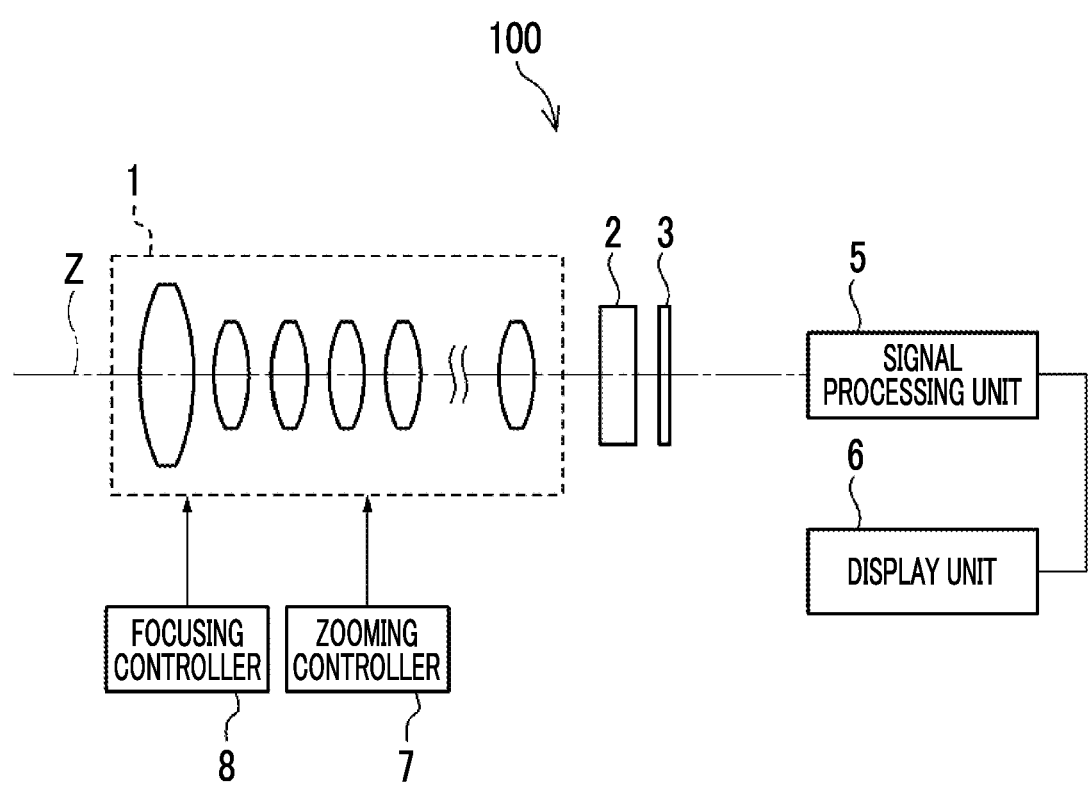
FIG. 15 is a diagram showing a schematic configuration of an imaging apparatus according to an embodiment.

Next, an imaging apparatus according to an embodiment of the present disclosure will be described. FIG. 15 shows a schematic configuration diagram of an imaging apparatus 100 using the zoom lens 1 according to the embodiment of the present disclosure as an example of the imaging apparatus according to the embodiment of the present disclosure. Examples of the imaging apparatus 100 include a broadcast camera, a movie camera, a video camera, a surveillance camera, and the like.

The imaging apparatus 100 includes a zoom lens 1, a filter 2 disposed on the image side of the zoom lens 1, and an imaging element 3 disposed on the image side of the filter 2. It should be noted that FIG. 15 schematically shows a plurality of lenses included in the zoom lens 1.

The imaging element 3 converts an optical image formed by the zoom lens 1 into an electric signal, and for example, a charge coupled device (CCD) or a complementary metal oxide semiconductor (CMOS) or the like can be used. The imaging element 3 is disposed such that the imaging surface thereof coincides with the image plane of the zoom lens 1.

The imaging apparatus 100 also comprises a signal processing unit 5 that calculates and processes an output signal from the imaging element 3, a display unit 6 that displays an image formed by the signal processing unit 5, a zooming controller 7 that controls zooming of the zoom lens 1, and a focusing controller 8 that controls focusing of the zoom lens 1. Although FIG. 15 shows only one imaging element 3, a so-called three-plate imaging apparatus having three imaging elements may be used.

The technology of the present disclosure has been hitherto described through embodiments and examples, but the technology of the present disclosure is not limited to the above-mentioned embodiments and examples, and may be modified into various forms. For example, values such as the curvature radius, the surface spacing, the refractive index, and the Abbe number of each lens are not limited to the values shown in the numerical examples, and different values may be used therefor.

What is claimed is:

1. A zoom lens consisting of, in order from an object side to an image side: a first lens group that has a positive refractive power; a middle group; and a final lens group that remains stationary with respect to an image plane during zooming and has a positive refractive power,
   wherein the first lens group remains stationary with respect to the image plane during zooming,
   wherein the middle group consists of, in order from the object side to the image side, a lens group that has a positive refractive power and moves by changing a spacing with an adjacent lens group during zooming, a lens group that has a negative refractive power and moves by changing a spacing with an adjacent lens group during zooming, and an image side movable lens group that has a negative refractive power and moves by changing a spacing with an adjacent lens group during zooming,
   wherein the image side movable lens group includes a positive lens and a negative lens, and
   assuming that
      a lateral magnification of the image side movable lens group at a wide angle end in a state in which an infinite distance object is in focus is $\beta nW$, and
      a lateral magnification of the image side movable lens group at a telephoto end in a state in which the infinite distance object is in focus is $\beta nT$,
   Conditional Expression (1) is satisfied, which is represented by $$1.1 < \beta nT/\beta nW \tag{1}.$$

2. The zoom lens according to claim 1, wherein assuming that
   a lateral magnification of the image side movable lens group at the wide angle end in a state in which the infinite distance object is in focus is $\beta nW$,
   a lateral magnification of the image side movable lens group at the telephoto end in a state in which the infinite distance object is in focus is $\beta nT$,
   a focal length of the zoom lens at the wide angle end in a state in which the infinite distance object is in focus is set to fW, and
   a focal length of the zoom lens at the telephoto end in a state in which the infinite distance object is in focus is fT,
   Conditional Expression (2) is satisfied, which is represented by $$0.4 < |(\beta nT/\beta nW)/(fT/fW)| \tag{2}.$$

3. The zoom lens according to claim 2, wherein Conditional Expression (2-1) is satisfied, which is represented by $$0.5 < |(\beta nT/\beta nW)/(fT/fW)| < 10 \tag{2-1}.$$

4. The zoom lens according to claim 1, wherein assuming that a lateral magnification of the image side movable lens group at the wide angle end in a state in which the infinite distance object is in focus is $\beta nW$, Conditional Expression (3) is satisfied, which is represented by $$\beta nW < 0 \tag{3}.$$

5. The zoom lens according to claim 4, wherein Conditional Expression (3-1) is satisfied, which is represented by $$-0.4 < \beta nW < -0.001 \tag{3-1}.$$

6. The zoom lens according to claim 1, wherein assuming that a lateral magnification of the image side movable lens group at the telephoto end in a state in which the infinite distance object is in focus is $\beta nT$, Conditional Expression (4) is satisfied, which is represented by $$\beta nT < -0.1 \tag{4}.$$

7. The zoom lens according to claim 6, wherein Conditional Expression (4-1) is satisfied, which is represented by $$-2 < \beta nT < -0.5 \tag{4-1}.$$

8. The zoom lens according to claim 1, wherein the final lens group includes a positive lens and a negative lens.

9. The zoom lens according to claim 1, wherein assuming that a lateral magnification of the final lens group at the wide angle end in a state in which the infinite distance object is in focus is $\beta eW$, Conditional Expression (5) is satisfied, which is represented by $$-0.9 < \beta eW < -0.5 \tag{5}.$$

10. The zoom lens according to claim 9, wherein Conditional Expression (5-1) is satisfied, which is represented by $$-0.85 < \beta eW < -0.6 \tag{5-1}.$$

11. The zoom lens according to claim 1, wherein assuming that
    a focal length of the first lens group in a state in which the infinite distance object is in focus is f1, and
    a focal length of the image side movable lens group in a state in which the infinite distance object is in focus is fn,
    Conditional Expression (6) is satisfied, which is represented by $$-0.8 < fn/f1 < -0.35 \tag{6}.$$

12. The zoom lens according to claim 1,
    wherein the zoom lens includes a stop closer to the image side than the first lens group, and
    assuming that
       a diameter of an on-axis luminous flux on a lens surface closest to the object side in the first lens group at the telephoto end in a state in which the infinite distance object is in focus is h1, and
       a diameter of an opening portion of the stop at the telephoto end in a state in which the infinite distance object is in focus is hs,
    Conditional Expression (7) is satisfied, which is represented by $$1.7 < h1/hs < 2.2 \tag{7}.$$

13. The zoom lens according to claim 1, wherein the first lens group includes at least one lens that moves along an optical axis during focusing.

14. The zoom lens according to claim 1, wherein Conditional Expression (1-1) is satisfied, which is represented by $$3 < \beta nT/\beta nW < 40 \tag{1-1}$$

15. An imaging apparatus comprising the zoom lens according to claim 1.

* * * * *